US009503540B2

United States Patent
Athas et al.

(10) Patent No.: US 9,503,540 B2
(45) Date of Patent: Nov. 22, 2016

(54) METHOD AND APPARATUS FOR ASYNCHRONOUS DISTRIBUTION OF CONTENT

(71) Applicant: Nokia, Espoo (FI)

(72) Inventors: Gregory Joseph Athas, Lisle, IL (US); Tuomas Veli Keskitalo, Oulunsalo (FI)

(73) Assignee: Nokia Technologies Oy, Espoo (FI)

( * ) Notice: Subject to any disclaimer, the term of this patent is extended or adjusted under 35 U.S.C. 154(b) by 240 days.

(21) Appl. No.: 13/890,946

(22) Filed: May 9, 2013

(65) Prior Publication Data

US 2014/0337405 A1 Nov. 13, 2014

(51) Int. Cl.
G06F 15/16 (2006.01)
H04L 29/08 (2006.01)

(52) U.S. Cl.
CPC .......... *H04L 67/26* (2013.01); *H04L 67/2838* (2013.01); *H04L 67/02* (2013.01)

(58) Field of Classification Search
None
See application file for complete search history.

(56) References Cited

U.S. PATENT DOCUMENTS

| 6,763,384 | B1 | 7/2004 | Gupta et al. | |
| 2004/0205165 | A1* | 10/2004 | Melamed | G06F 17/30902 709/219 |
| 2009/0204666 | A1 | 8/2009 | Sana et al. | |
| 2013/0086146 | A1* | 4/2013 | Addala et al. | 709/203 |
| 2013/0179430 | A1* | 7/2013 | Archambault | G06Q 30/0282 707/711 |
| 2013/0190032 | A1* | 7/2013 | Li | H04L 67/28 455/517 |

FOREIGN PATENT DOCUMENTS

| EP | 1775911 A1 | 4/2007 |
| GB | 2496046 A | 5/2013 |
| WO | 2013038053 A1 | 3/2013 |

OTHER PUBLICATIONS

NPL, Trevor Armstrong et al., "Efficient and Transparent Dynamic Content Updates for Mobile Clients," MobiSys conference publication, Jun. 2006, also noted in the IDS, Abstract, and Sections 1-3.*
Armstrong et al., "Efficient and Transparent Dynamic Content Updates for Mobile Clients", MobiSys '06 Proceedings of the 4th International Conference on Mobile Systems, Applications and Services, Jun. 19-22, 2006, pp. 56-68, retrieved from http://dl.acm.org/citation.cfm?id=1134687> on Jun. 30, 2014.
Notification of Transmittal of the International Search Report and the Written Opinion of the International Searching Authority, or the Declaration along with Written Opinion of the International Searching Authority for International Application No. PCT/FI2014/050330, mailed Jul. 8, 2014, 8 pages.
International Search Report for related International Application No. PCT/FI2014/050330, mailed Jul. 8, 2014, 5 pages.

\* cited by examiner

*Primary Examiner* — Wing F Chan
*Assistant Examiner* — Padma Mundur
(74) *Attorney, Agent, or Firm* — Ditthavong & Steiner, P.C.

(57) ABSTRACT

An approach is provided for asynchronous distribution of content and notifications of updates to a client. A proxy server causes an establishment of at least one communication connection between at least one proxy client, at least one proxy server, and/or at least one service provider. The proxy server determines one or more updated content items available to the at least one proxy client. The proxy server causes a transmission of the one or more updated content items, one or more notifications regarding the one or more updated content items, or a combination thereof via the at least one communication connection.

25 Claims, 19 Drawing Sheets

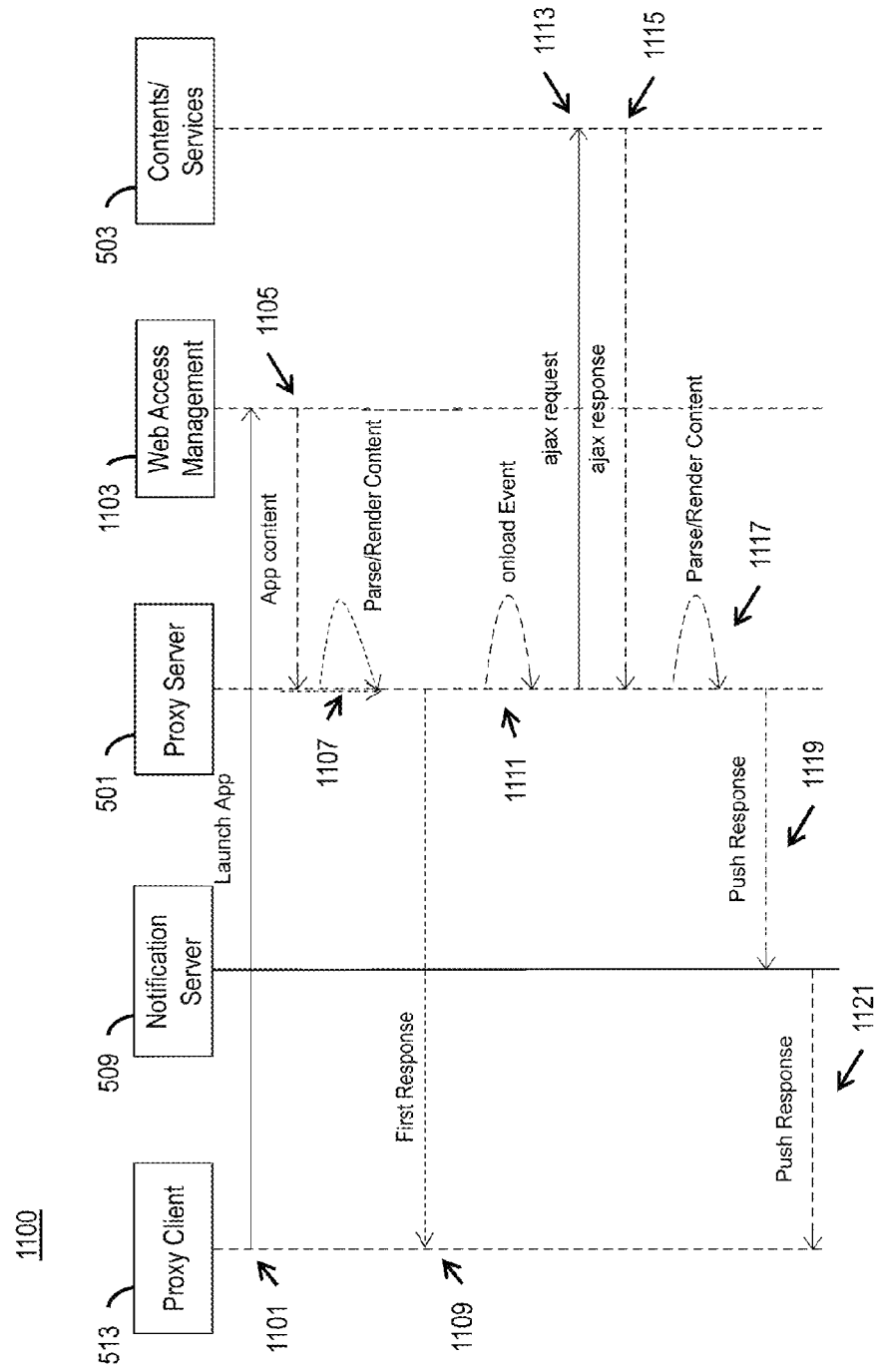

METHOD AND APPARATUS FOR ASYNCHRONOUS DISTRIBUTION OF CONTENT

BACKGROUND

Wireless (e.g., cellular) service providers and device manufacturers are continually challenged to deliver value and convenience to consumers by, for example, providing compelling network services, applications, and content. As users utilize various devices and applications (clients) to access contents at various Internet sources, some of the applications may include various processes for communicating and retrieving the contents from the sources via a proxy server. For example, in a proxy web browser a process may include operations that are client driven single request-response operations, which originate and terminate in the client. For instance, when the client requests the proxy web browser to load a web page or initiate an event, it then has to wait until the operations of the browser on the proxy server side are complete. In one example, to load a web page into a client, usually a proxy server first delivers a static template of the web page and then initiates a network request to receive live content that is processed and written into the web page asynchronously, where in a proxy browser, the user does not receive/see any content until the live content has been received and processed at the proxy server. In the meantime, the client may be blocked from performing other tasks as well as it may not receive possible incremental updates to the web page. Accordingly, service providers and/or device manufacturers face significant technical challenges to overcome such limitations by enabling asynchronous distribution of content and notifications of updates.

SOME EXEMPLARY EMBODIMENTS

Therefore, there is a need for an approach for providing asynchronous distribution of content and notifications of updates to a client.

According to one embodiment, a method comprises causing, at least in part, an establishment of at least one communication connection between (a) at least one proxy client, and (b) at least one proxy server, at least one service provider, or a combination thereof. The method further comprises determining one or more updated content items available to the at least one proxy client. The method also comprises causing, at least in part, a transmission of the one or more updated content items, one or more notifications regarding the one or more updated content items, or a combination thereof via the at least one communication connection.

According to another embodiment, an apparatus comprises at least one processor, and at least one memory including computer program code for one or more programs, the at least one memory and the computer program code configured to, with the at least one processor, cause, at least in part, the apparatus to cause, at least in part, an establishment of at least one communication connection between (a) at least one proxy client, and (b) at least one proxy server, at least one service provider, or a combination thereof. The apparatus is further caused to determine one or more updated content items available to the at least one proxy client. The apparatus is also caused to cause, at least in part, a transmission of the one or more updated content items, one or more notifications regarding the one or more updated content items, or a combination thereof via the at least one communication connection.

According to another embodiment, a computer-readable storage medium carries one or more sequences of one or more instructions which, when executed by one or more processors, cause, at least in part, an apparatus to cause, at least in part, an establishment of at least one communication connection between (a) at least one proxy client, and (b) at least one proxy server, at least one service provider, or a combination thereof. The apparatus is further caused to determine one or more updated content items available to the at least one proxy client. The apparatus is also caused to cause, at least in part, a transmission of the one or more updated content items, one or more notifications regarding the one or more updated content items, or a combination thereof via the at least one communication connection.

According to another embodiment, an apparatus comprises means for causing, at least in part, an establishment of at least one communication connection between (a) at least one proxy client, and (b) at least one proxy server, at least one service provider, or a combination thereof. The apparatus further comprises means for determining one or more updated content items available to the at least one proxy client. The apparatus also comprises means for causing, at least in part, a transmission of the one or more updated content items, one or more notifications regarding the one or more updated content items, or a combination thereof via the at least one communication connection.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 11A through 11E illustrate timing-sequence diagrams of example processes for asynchronous distribution of content and notifications of updates to a client, according to various embodiments;

DESCRIPTION OF PREFERRED EMBODIMENT

A method and apparatus for providing asynchronous distribution of content and notifications of updates to a client. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to providing asynchronous distribution of content and notifications of updates to a client within a wireless network environment, it is contemplated that the various embodiments of the approach described herein may be used within any type of communication system or network and with any mode of communication available on the network (e.g., data communications, Internet communication, voice communication, text communication, etc.) In addition, although the various embodiments are further described with respect to mobile devices, it is contemplated that the various embodiments are applicable to any type of device with network access (e.g., stationary terminals, personal computers, etc.).

Figure 1:
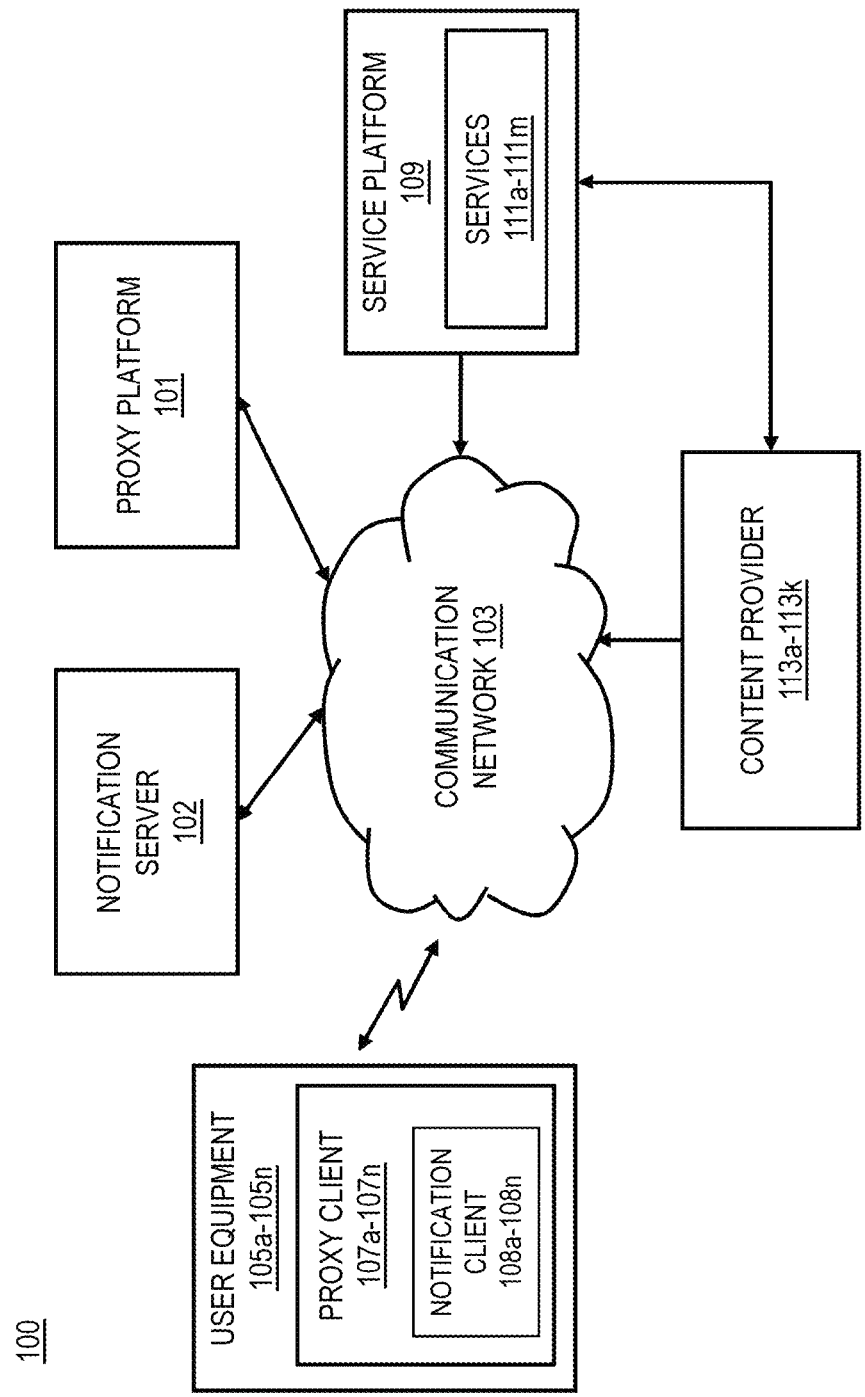
FIG. 1 is a diagram of a communication system capable of providing asynchronous distribution of content and notifications of updates to a client, according to an embodiment.

FIG. 1 is a diagram of a communication system capable of providing asynchronous distribution of content and notifications of updates to a client. As discussed previously, implementing mobile web services within a wireless environment can potentially tax the relatively limited resources (e.g., bandwidth, processing power, memory, battery power, etc.) that are available within the environment (e.g., within a mobile device). Moreover, as web-based applications become more sophisticated by employing the latest web technologies (e.g., scripting via languages such as JavaScript), the problem of having sufficient resources at mobile devices to support new applications also increases.

In a proxy web browser most operations are client (e.g., in a user device) driven single request-response operations, where various events may originate and terminate in the client. For example, if the client requests the proxy browser to load a web page or initiate an event, the client must wait until various browser operations on the proxy server side are complete. However, while the proxy server may be processing the requests and/or interfacing with various service and/or content providers, the client may be blocked from attending to other processes and/or tasks. Further, if proxy server receives multiple incremental changes to the requested web page and contents, the client may not be notified of these changes until the final results are integrated and presented to the client. This delay in receiving updated contents and information may degrade user experience at the client and with a perception of slow performance of the system, for example, when the user may be staring at blank or old contents when incremental changes/updates may be available at the proxy server and/or at the service provider. In one scenario, JavaScript operations may take some time to complete and/or may not produce any noticeable changes/updates for the end user/proxy client. Ideally the proxy client may wish to initiate the request and only be notified if there is a noticeable change/update to the content, otherwise it may not be necessary for the proxy client to wait or monitor for a response. Furthermore, if there are timer based updates, the updates may occur on the server, but the client may not be notified of the updates. In one scenario, a web page is normally loaded into the client by first delivering a static template of the page, and then the client makes a network request to receive live content that is processed and written into the web page asynchronously. However, in a proxy browser, the user may not see any content until all the live content has been received and processed. For example, a sports-score web page is loaded into a browser. In a conventional browser, the sports scores may be updated automatically without any user intervention, whereas in a proxy browser, the automatic updates may not occur unless initiated by user interaction or by refreshing the entire page which may cause the delivery of large amounts of redundant and unnecessary data to the client as well as potentially long loading times waiting for the web content to reloaded and rendered.

To address this problem, a system 100 of FIG. 1 introduces the capability to provide asynchronous distribution of content and notifications of updates to a client. Traditionally, in a conventional browser, all actions may be performed at the client endpoint (e.g., mobile device), which may include HTML parsing and rendering as well as execution of JavaScript. However, a proxy based browser includes distributed components that reside at a proxy client and a proxy server, where the proxy client renders a displayable version of a web document. Further, the proxy server optimizes web documents for speed and payload efficiency where a script, for example JavaScript, may also be executed at the proxy server. Furthermore, a proxy server may deliver only updated portions of a web page/content to the proxy client. In a proxy based browser, a proxy client at a user device (e.g., a mobile phone) may communicate with a proxy server to request content from various contents/services providers where the proxy server may interface with one or more contents/services providers to obtain the requested content. By way of example, a user may use a proxy based browser on the user device to connect to a website and request certain sport scores, weather information, stock market news, or the like. In the system 100, the proxy server may process the request for the content, obtain the content, and respond to the proxy client with the content. In various embodiments, a push channel may be established between the proxy server and the proxy client and/or between a contents/services provider and the proxy client, where further events after the initial request/response has been completed, may be transmitted to the proxy client. In one scenario, an asynchronous transmission may allow the proxy server process (e.g., HTML, CSS, JavaScript) to continue execution and completion of inputs/outputs and/or time-based actions in parallel to the operations of the proxy client. In one embodiment, once the actions are completed, the proxy client may be notified via the push channel, wherein there may be multiple asynchronous responses to the proxy client. Various embodiments of distributed script processing described herein may, at least, improve user perceived performance and experience where the proxy server and/or a service provider may initiate a push to provide the asynchronous updates and/or notifications of available updates/events, wherein the proxy client may not need to poll or keep an open network connection.

In one embodiment, a proxy server may interface with various contents/services providers for requesting and receiving content as well as interfacing with a notification server whereby asynchronous content updates and/or notifications of updates/events may be transmitted to a notification client associated with a proxy client at a user device. In one scenario, a web app at a proxy client may request for certain content from a proxy server, wherein the proxy server may request and receive the content from one or more content providers and deliver the content to the web app at the proxy client. Later, the proxy server may receive various updates to the content item from the content providers where the proxy server may asynchronously transmit the updates or a notification of available updates to a notification server for forwarding to a notification client at the proxy client so that the proxy client may directly receive the updates and/or may process the notification for determining whether to request the updates from the proxy server.

In one embodiment, a contents/services provider may directly interface with a notification server for forwarding the updated contents and/or notifications to the notification client at the proxy client.

As shown in FIG. 1, the system 100 comprises a proxy platform 101 (e.g., a proxy server) and a notification server 102 that can provide for proxy web browsing over the communication network 103. In one embodiment, the system 100 enables users (e.g., via user equipment (UEs) 105a-105n—also collectively referred to as UEs 105) to be able to receive web content by way of the proxy platform 101. As previously discussed, proxy browsing is a technology that reduces the amount of data that needs to be transferred between a web server and a web browser. An intermediate proxy server located between a mobile device and the Internet may, for example, be used to reduce image sizes, simplify the HTML markup of a webpage, compress transmitted data, execute scripts (e.g., JavaScripts), or the like. Proxy browsing also allows for a reduction in hardware requirements for internet enabled mobile devices, faster rendering of webpages, and reduced bandwidth usage. Further, a notification server 102 may receive asynchronous updates and notifications from the proxy platform 101 and then forward to one or more notification clients 108.

The system 100 further includes a proxy browsing architecture which consists of one or more proxy clients 107a-107n (also collectively referred to as proxy clients 107) and notification clients 108a-108n (also collectively referred to as notification client 108) operating within respective client devices (e.g., UEs 105a-105n). In various embodiments, the proxy clients 107 may route at least a portion of the communication traffic from the UEs 105 through the proxy platform 101 and/or the notification server 102. In some embodiments, the proxy clients 107 may be a browser application. In addition or alternatively, the proxy clients 107 can be independent processes executing in the UEs 105, or can be incorporated in other applications executing in the UEs 105.

By way of example, the communication endpoints may include a service platform 109, the services 111a-111m (also collectively referred to as services 111), the content providers 113a-113k (also collectively referred to as content providers 113), or any other component with connectivity to the communication network 103 (e.g., another UE 105). For example, the service platform 109, the service 111, and/or the content providers 113 may provide any number of services (e.g., mapping services, social networking services, media services, content services, etc.) via a web server or other means of communications (e.g., text messaging, voice, instant messaging, chat, etc.). In other words, the communication endpoints represent a terminating point of communications from the proxy clients 107, and an originating point of communications to the proxy clients 107.

In one embodiment, the proxy platform 101 receives requests from the proxy clients 107 to route communication traffic to the intended communication endpoints. In addition, the proxy platform 101 can route return communication traffic from the communication endpoints to the proxy clients 107 and/or UEs 105. In one embodiment, the communication traffic may be established between the notification server 102 and one or more services 111 and/or content providers 113 without necessarily being routed via the proxy platform 101. In one use case scenario, a proxy client 107 may submit a request for content (e.g., webpage, web application, other web content, etc.) to the proxy platform 101 where the proxy platform 101 may request and obtain the content from the services 111 and/or the content provider 113, where the proxy platform 101 may directly provide the content to the proxy client 107. Subsequently, the proxy platform 101 may receive updates to the content from the services 111 and/or the content provider 113, where the proxy platform 101 may then establish an communication channel (e.g., asynchronous) with the notification server 102 so that the notification server 102 may transmit to the notification client 108 the updated contents or a notification on availability of the updated contents. In the case of receiving notifications, the proxy client 107 and/or any applications on the UE 105 may process the notifications to determine if the available updated contents should be requested from the proxy platform 101. In another scenario, the services 111 and/or the content provider 113 may forward the updated contents or notification of availability of the updated contents directly to the notification server 102 for forwarding to the notification client 108.

In one embodiment, the system 100 causes, at least in part, an establishment of at least one communication connection between (a) at least one proxy client, and (b) at least one proxy server, at least one service provider, or a combination thereof. In one embodiment, a proxy client 107 may communicate with a proxy server (proxy platform 101), the services 111, and/or the content providers 113 for requesting and receiving one or more webpages, web applications, notifications, other web contents, or the like, wherein the communications may be direct between the two endpoints or via the communication network 103.

In one embodiment, the system 100 determines one or more updated content items available to the at least one proxy client. In one embodiment, the proxy platform 101 may receive a notification from the services 111 and/or the content providers 113 and determine the availability of the one or more updated content items. In one embodiment, the services 111 and/or the content providers 113 may determine the availability of the one or more updated content items.

In one embodiment, the system 100 causes, at least in part, a transmission of the one or more updated content items, one or more notifications regarding the one or more updated content items, or a combination thereof via the at least one communication connection. In one embodiment, the proxy platform 101 may cause the transmission directly to the proxy client 107. In one embodiment, the proxy platform 101 may cause the transmission to the proxy client 107 via the notification server 102 and the notification client 108. In one embodiment, the services 111 and/or the content providers 113 may cause the transmission to the proxy client 107 via the notification server 102 and the notification client 108. In one embodiment, the at least one communication connection is a push notification connection established via at least one notification server, at least one notification client, or a combination thereof. In one embodiment, the push notification connection is an asynchronous communication connection, whereby a transmission may be initiated by at least one end point without a request from receiving end point. In one embodiment, the at least one communication connection is established based, at least in part, on at least one Hyper Text Markup Language 5 (HTML5) protocol server-sent event (SSE) from the at least one service provider. For example, when there is an update to a content item at a content provider, the content provider server may send the updated content and/or one or more notifications to the proxy server indicating an availability of the update. In one embodiment, the transmission may include one or more portions of the one or more updated content items delivered to the at least one notification client via the at least one communication connection.

In one embodiment, wherein the transmission includes the one or more updated content items as a payload delivered to the at least one notification client via the at least one communication connection, the system 100 causes, at least in part, a delivery of the one or more updated content items from the at least one notification client to the at least one proxy client. In one embodiment, the proxy platform 101, the services 111, and/or the content providers 113 may cause a transmission of one or more updated content items to the notification client 108 via the notification server 102, wherein the notification client 108 may deliver the updated content items to the proxy client 107.

In one embodiment, wherein the transmission includes the one or more notifications delivered to the at least one notification client via the at least one communication connection, the system 100 causes, at least in part, a generation of a request by the at least one proxy client for the one or more updated content items based, at least in part, on the one or more notifications. In one embodiment, the proxy client 107 may receive a notification, for example from the proxy platform 101, indicating availability of one or more updated content items.

In one embodiment, wherein the transmission includes one or more portions of the one or more updated content items delivered to the at least one notification client via the at least one communication connection, the system 100 causes, at least in part, a delivery of the one or more updated content items via a content exchange connection between the at least one proxy server and the at least one proxy client. In one embodiment, the proxy platform 101 may receive a request for one or more updated content items from the proxy client 107, wherein the proxy platform 101 may cause a transmission of the one or more updated content items directly to the proxy client 107 via a content exchange connection between the proxy server and the proxy client.

In one embodiment, the system 100 causes, at least in part, a delivery of the one or more portions from the at least one notification client to the at least one proxy client for rendering by the at least one proxy client as the proxy client requests one or more remaining portions of the one or more updated content items. In one embodiment, the proxy client 107 may request a delivery of all available updated content items. In one embodiment, the proxy client 107 may request delivery of one or more portions of the available updated content items. In one embodiment, the proxy client 107 may request delivery of one or more remaining portions of the available updated content items.

In one embodiment, the system 100 causes, at least in part, a registration of at least one web application to associate at least one notification identifier with the at least one web application, wherein the at least one web application is executed via the at least one proxy client. In one embodiment, the UE 105 may include one or more web applications where at least one web application is registered and associated with at least one notification identifier and a notification client at the UE 105, wherein the at least one web application is executed via the at least one proxy client. For example, the web application may be utilized to consume various contents available at the UE 105 and/or at a web site.

In one embodiment, the system 100 causes, at least in part, a routing of the one or more updated content items, the one or more notifications, to the at least one web application based, at least in part, on the at least one notification identifier. In various embodiments, the proxy platform 101, the notification server 102, the services 111, and/or the content providers 113 may utilize a notification identifier for delivering one or more notifications and/or updated content items to a notification client 108 associated with a certain proxy client and web application.

In one embodiment, the system 100 causes, at least in part, a refresh of the at least one web application based, at least in part, on the registration, the transmission, or a combination thereof. In one embodiment, the web application may be refreshed by the proxy platform 101, the notification server 102, the services 111, and/or the content providers 113 based on a registration of a web application and/or a transmission to the notification client 108. In one embodiment, the refresh may include updates to one or more content items or notification of available updated content items.

In one embodiment, the system 100 determines whether to include the one or more updated content items or whether to include the one or more notifications in the transmission based, at least in part, on resource availability information associated with the at least one proxy client, the at least one notification client, or a combination thereof. In various embodiments, the proxy platform 101, the notification server 102, the services 111, and/or the content providers 113 may determine resource availability information associated with the at least one proxy client and/or the at least one notification client in order to determine whether to deliver the one or more updated content items or to deliver a notification on availability of one or more updated content items. For example, the UE 105 may or may not have appropriate hardware and/or software resources (e.g., proxy client 108, other applications, notification client 108, battery power, bandwidth, etc.) for receiving and processing various updated content items. In one example, only a notification of available updated contents may be delivered to the notification client 108 so that retrieval of the updated contents may be scheduled and handled accordingly at the UE 105. In one embodiment, other components of the system 100 may assist with processing various content items and related tasks before delivering to the UE 105.

In one embodiment, the system 100 causes, at least in part, a rendering of the one or more updated content items, the one or more notifications, or a combination thereof in at least one notification user interface, wherein the at least one notification user interface includes, at least in part, one or more options for causing, at least in part, an initiation of the at least one proxy client. In one embodiment, the one or more updated content items and/or the one or more notifications may be presented via a notification UI at the UE 105, wherein a user and/or one or more applications at the UE 105 may cause the initiation of a proxy client 108 at the UE 105.

By way of example, the UE 105 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 105 can support any type of interface to the user (such as "wearable" circuitry, etc.).

Additionally, the communication network 103 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, communication between a UE 105, a proxy platform 101, a notification server 102, a content provider 113, and/or a service platform 109 may be facilitated via the communication network 103 using well known, new or still developing protocols. In this context, a protocol includes a set of rules defining how the network nodes within the communication network 103 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the proxy clients 107 and the proxy platform 101 or the notification server 102 may interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
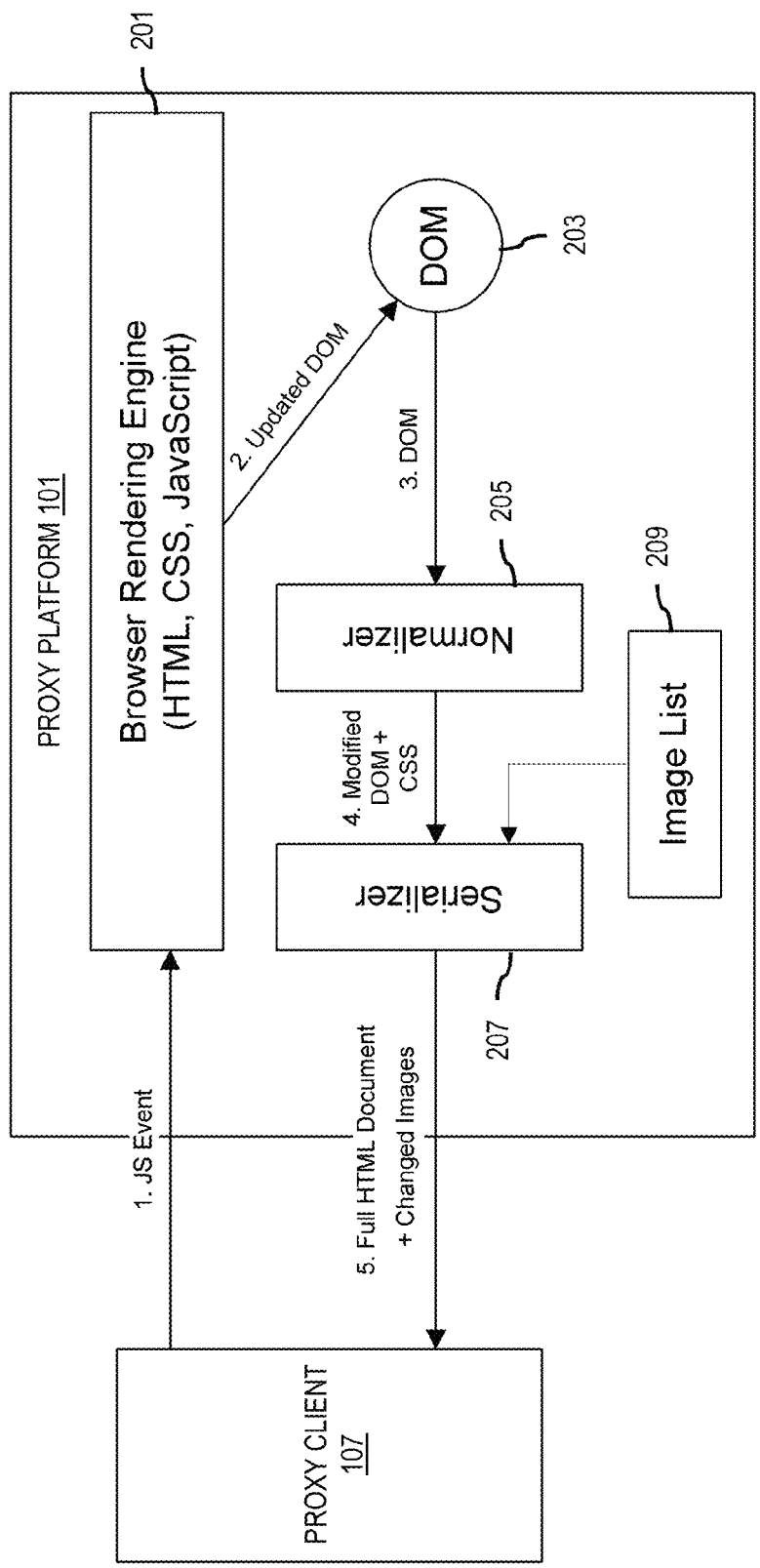
FIG. 2 is a diagram of components of a proxy server for providing distributed script processing for media reuse, according to an embodiment.

FIG. 2 is a diagram of components of a proxy server for providing distributed script processing for media reuse, according to one embodiment. By way of example, the proxy platform 101 includes one or more components for providing distributed script processing. It is contemplated that the functions of these components may be combined in one or more components or performed by other components of equivalent functionality. In one embodiment, the proxy platform 101 includes a browser rendering engine 201 for rendering web content based one or more scripting events. More specifically, the browser rendering engine 201 interprets web code and scripts (e.g., HTML, CSS, JavaScript) to generate or otherwise update a document object model (DOM) 203 to represent the rendering of the web content. The proxy platform 101 then uses a normalizer module 205 to process or modify the DOM 203 based, at least in part, on the capabilities and or requirements of the proxy client 107. The normalizer module 205 then interacts with the serializer module 207 to generate or render the web document that is to be sent to the proxy client 107 for display. In one embodiment, the serializer module 207 has connectivity to an image list module 209 to provide script processing functions related, at least in part, to media reuse or smart image update. By way of example, smart image update is a mechanism for the proxy client 107 to reuse images on a single web page when using distributed scripts.

Traditionally, the proxy client 107 would not store images in memory across requests to the proxy platform 101. Consequently, the proxy platform 101 would have to send down the entire set of images contained in requested web content. This would be true for requests for new pages as well as same-page requests. In one embodiment, same-page requests are web content requests that go back to the proxy platform 101, but do not change the full path of the address or Universal Resource Location (URL) being requested. Most of the same-page requests are script events (e.g., JavaScript events) such as callbacks. In one embodiment, with smart image update, the proxy client 107 keeps images in memory across same-page requests.

To perform smart image update or media reuse on the server side, the proxy platform 101 maintains at least two image lists 209. One image list 209 is the current request list which maintains a list of media items in the DOM 203 of the current request. Another image list 209 is the current page list which maintains a list of images that were already sent down to the proxy client for the address or URL currently being handled. In one embodiment, the current page list is reset (cleared or emptied) every time the URL or address of the request changes. For every each request, the proxy platform 101 checks the media items (e.g., images) in the current request list against the current page list. If an image or media item in the current request list exists in the current page list, the image or media item is not sent down to the proxy client 107, thereby reducing network traffic and bandwidth usage. If the image or media item does not exist, the image or media item is sent to the proxy client 107 and added to the current page image list.

Figure 3A:
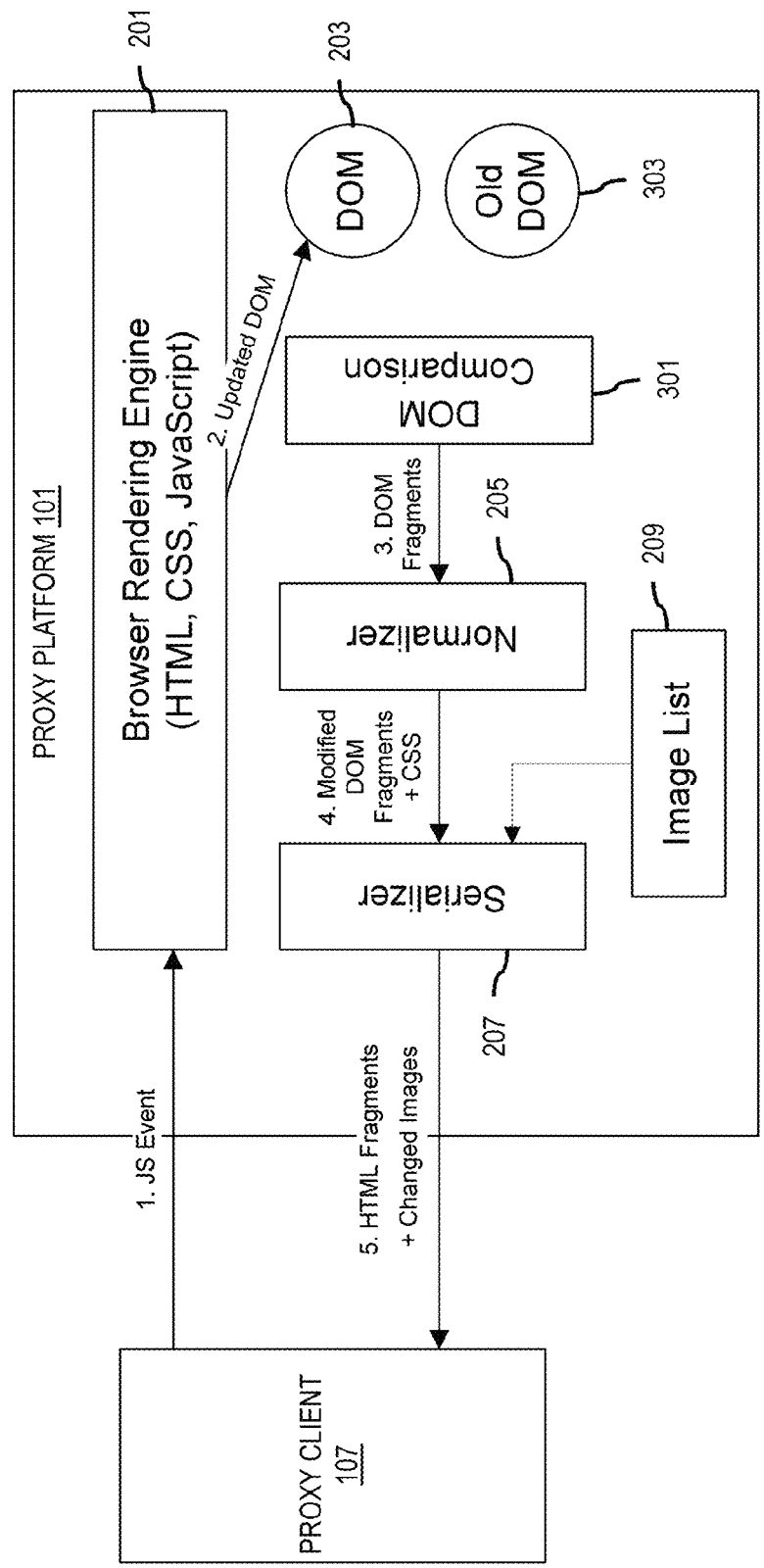
FIG. 3A is a diagram of components of a proxy server for providing distributed script processing for performing partial updates, according to an embodiment.

FIG. 3A is a diagram of components of a proxy server for providing distributed script processing for performing partial updates, according to one embodiment. As shown in FIG. 3A the proxy platform 101 includes the same components as described with respect to FIG. 2 with the additional of a DOM comparison module 301 and an old DOM 303 for performing partial updates. As previously described, the proxy platform 101 can perform partial page updates in response to script events to, for instance, reduce the amount of data that is transmitted to the proxy client 107 if a callback changes only a portion of the DOM or the request web content.

In one embodiment, building a partial page response is based, at least in part, on determining how the web content request (e.g., a script callback request) has changed the web content or the old DOM 303. By way of example, this is accomplished by saving a copy of the DOM before the callback request is executed (henceforth referred to as the old DOM 303). The DOM comparison module 301 can then compare the old DOM 303 to the DOM 203 after the callback request is processed (henceforth referred to as the new DOM 203). In one embodiment, the DOM comparison module 301 uses an algorithm to recursively walk through the two DOMs 203 and 303 (e.g., depth first) in parallel looking for differences. Although, the description below is with respect to a particular algorithm, it is contemplated that the DOM comparison module 301 can use any process to determine differences between the DOMs 203 and 303. When a node of the two DOMs 203 and 303 is identified as different, the DOM comparison module 301 can search for an ancestor node in the new DOM 203 with an ID attribute (by returning from the recursion). If an ancestor node is found, then that node is added to a list of modified nodes. If no ancestor node with an ID attribute is found, then the DOM comparison module 301 stops and a partial page update is not sent.

In one embodiment, before a node is added to the modified node list, the DOM comparison module 301 can prune from the list any subtending nodes already in the list. By way of example, the DOM comparison module 301 does this by storing the size of the list when it starts recursively walking each node's children. The walk then continues with the parent node just added to the modified node list. It is noted that there is no reason to check any more children of the node added to the list because the child nodes would already be impacted.

In another embodiment, as the DOM comparison module 301 compares the two DOMs 203 and 303, the module 301 keeps track of the number nodes in the new DOM 203 that have not changed and the number of nodes that subtend the list of modified nodes. The DOM comparison module 301 can then use this information as one of the factors for determining whether a partial page update is recommended.

In some embodiments, the DOM comparison module 301 can ignore a subset of attributes and tags that are designated as not significant. In addition, the DOM comparison module 301 can be configured to ignore nodes associated with insignificant whitespaces.

Figure 3B:
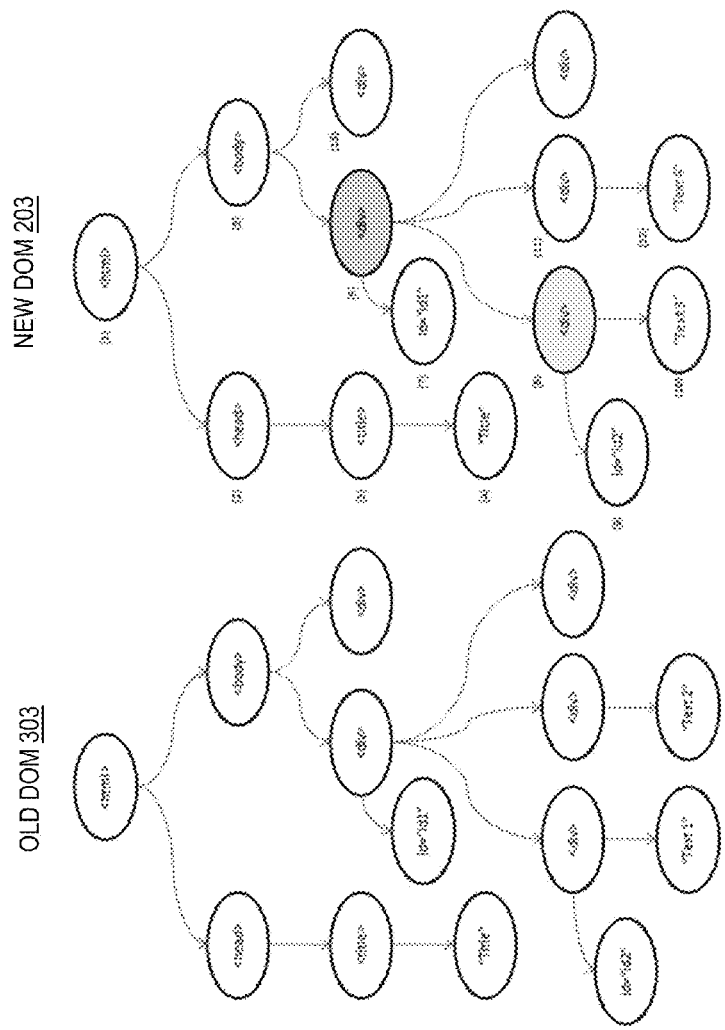
FIG. 3B is a diagram depicting a document object model (DOM) comparison for performing partial updates, according to an embodiment.

FIG. 3B is a diagram depicting a document object model (DOM) comparison for performing partial updates, according to one embodiment. More specifically, FIG. 3B shows the structure of an old DOM 303 before a callback request and a new DOM 203 after the callback request is processed by the proxy platform 101. To perform a partial update, the proxy platform 101 identifies what has changed in the new DOM 203 and communicate this information to the proxy client 107.

A summary of how the DOM comparison module 301 would identify the differences between the two DOMs 203 and 303 is summarized as follows:
Node (1) matches, continue with first (and only) child (2)
Node (2) matches, continue with first (and only) child (3)
Node (3) matches, continue with first (and only) child (4)
Node (4) matches, since no children return to the first ancestor node with another child (1) and proceed to its next child (5)
Node (5) matches, continue with first child (6)
Node (6) matches including its attribute node (7), continue with first child (8)
Node (8) matches including its attribute node (9), continue with first (and only) child (10)
Node (10) does not match:
   return to the first node with an id attribute (8)
   add (8) to the list
   return to that node's parent node (6)
   proceed with that nodes next child (11)
Node (11) matches, continue with first (only) child (12)
Node (12) does not match:
   return to the first node with an id attribute (6),
   remove the subtending node (8) from the list
   add (6) to the list
   return to that node's parent node (5)
   proceed with its next child (13)
   note that we did not visit the third child of node (6)
Node (13) matches, since no children return the first ancestor node with another child (there are not any)
Done.

In one embodiment, once the DOM comparison module 301 has identified the nodes that have subtending changes, these changes are communication to the proxy client by sending the changes in, for instance, a set of Mobile Web Library (MWL) script commands (e.g., JavaScript commands). By of example, each node with a subtending change adds an MWL "insertHTML" method call to the response. This method allows the proxy platform 101 to replace the existing HTML for a specified node with new HTML expressed as a string. The node to update is identified by its ID attribute. If the call back processing creates any new styles, then this is communicated to the proxy client 107 by adding an MWL "addNewStyle" method call to the response for each new style. The "addNewStyle" method calls are added to the response before the "insertHTML" method calls.

In one embodiment, if no changes are detected, then a response (e.g., a 204 HTTP NO CONTENT response) is sent to the proxy client 107. If the DOM comparison module 301 determines that the changes so large (e.g., above a threshold value of modified nodes) that a partial page update is not desirable, then the proxy platform 101 can sent a response that includes the HTML for the entire new page.

By way of example, when the proxy client 107 receives a callback response, the proxy client 107 will process it as appropriate. For example, if a 204 (HTTP NO CONTENT) response is received from the proxy platform 101, no additional changes will be done to the DOM on the proxy client 107. If the proxy platform 101 sent a partial page update to the proxy client 107, then the client 107 will execute the MEL methods (e.g., "insertHTML" and "addNewStyle") in the partial page update to the current DOM. If the proxy platform 101 response was the HTML for the entire new page, the client will replace the current DOM with the DOM corresponding to the new HTML. However, in some embodiments, the proxy client will keep using all of the media (e.g., images) from the old page, and all the MWL timers for the page will continue running.

In some embodiments, MWL statements executed at the proxy client 107 can change the state of the DOM, for example, when displaying a hidden block of content. In this case, the DOM on the proxy platform 101 will not be aware of the changes made on the proxy client 107. Accordingly, without DOM synchronization, when a callback request is made to the proxy platform 101, the resulting response may undo changes that were made on the proxy client 107.

To avoid this situation, the proxy platform 101 and the proxy client 107 may use DOM synchronization. With DOM synchronization, every event handler that is executed at the proxy client 107 is tracked and sent to the proxy platform 101 as part of the callback request. The proxy client 107 will track all event handlers that were executed on the client, and the order they were executed in. When the client executes a MWL.callback( ) statement, the proxy client 107 can send a HTTP POST request to the server. The POST request will include DOM synchronization data as well as the current value of all input fields on the page, and all other data that the proxy platform 101 uses to distinguish the current webpage and browser session from others. Once the proxy client 107 sends a MWL.callback( ) request to the proxy platform 101, the proxy client 107 can discard the information about previously executed event handlers. Next time the proxy client 107 executes the MWL.callback( ) the proxy client 107 can send to the proxy platform 101 just the DOM synchronization data for event handlers that were executed since the previous MWL.callback( ).

In one embodiment, while processing the callback, the proxy platform 101 will process DOM synchronization data in the callback request. For each DOM synchronization event, the proxy platform 101 will get the contest of the event handler from the original DOM, extract any MWL statements and execute them against the original DOM. After all the DOM synchronization events have been processed, the original DOM on the proxy platform 101 will have the same state as the DOM on the proxy client 107. In some embodiments, the proxy platform 101 will then normalize the original DOM; this is done so that any changes made by the synchronization process will not be resent back to the proxy client by the DOM comparison process.

Figure 4:
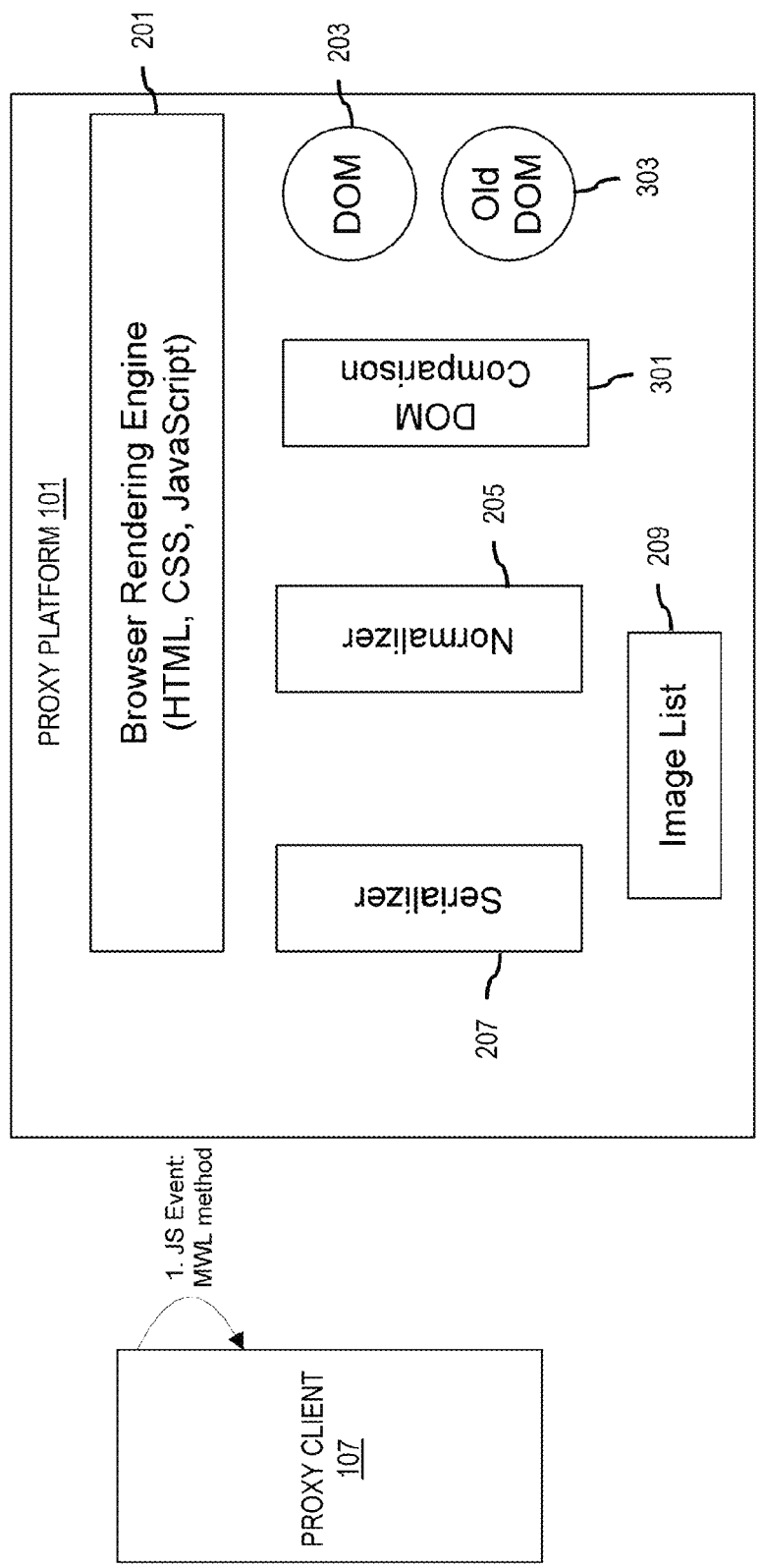
FIG. 4 is a diagram of components of a proxy server for providing distributed script processing for using local device resources, according to an embodiment.

FIG. 4 is a diagram of components of a proxy server for providing distributed script processing for using local device resources, according to one embodiment. In one embodiment, access to the local device resources is by way of the MWL. As previously noted, MWL is a script (e.g., JavaScript) library to handle basic on device operations. In one embodiment, the MWL can be implemented natively in the proxy client 107. MWL methods are invoked inline to execute on the proxy client 107. Examples of MWL methods include "addClass", "removeClass", "toggleClass", "switchClass", "setGroupTarget", "setGroupNext", "iterateClass", "show", "hide", "toggle", "setInputValue", "insertHTML", "replaceChild", "scrollTo", and the like. As shown in FIG. 4, the components of the proxy platform 101 for using local device resources (e.g., MWL), are the same as described with respect to FIG. 3A.

In this case, the proxy platform 101 and the proxy client 107 support MWL. By way of example, support for MWL and non-MWL scripts is enabled on events such as onload, onunload, onclick, onchange, and the like. The proxy platform 101 will strip non-MWL scripts before sending to the proxy client 107. In one embodiment, MWL statements are left alone and remain in the order specified on the event. Non-MWL statements are aggregated and converted to a single MWL.callback( ) statement that will be sent by the proxy clients 107 to the proxy platform 101 for server-side script processing when the applicable event occurs.

In another embodiment, the proxy platform 101 can run all non-MWL scripts specified in the onload event before sending the DOM to the proxy client 107. Any remaining statements in the event will be MWL statements that the proxy client should run when the document is loaded.

In certain embodiments, some event handlers support both MWL which is executed on the proxy client 107 and scripts (e.g., JavaScript) which is executed on the proxy platform 101. During the translation, the proxy platform 101 can examine the statements in each event handler. The MWL statements will be left as-is while any script (e.g., JavaScript) statements will be replaced by a MWL.callback( ) statement which will make a request to the proxy platform 101 to execute the script statements and return any updates made to the DOM. By way of example, similar translation is performed for MWL statements which add synthetic event listeners and MWL statements that support scripts in their arguments.

In one embodiment, when the proxy client 107 detects an event with a MWL handler, the proxy client will execute all the methods in the MWL serially, in the order specified by the handler. Most MWL methods make changes to the DOM, and the proxy client 107 will display the updated DOM once the changes are made. Some MWL methods (MWL.callback( )) require sending a request to the proxy platform 101 and waiting for a reply before executing other methods and updating the DOM.

In yet another embodiment, distributed script processing includes support for starting, running, and stopping timers. The proxy platform 101 can include methods for starting and stopping timers along with other methods in an event. Each timer method call specifies how many times the timer should run, the duration, and the MWL methods to be executed when the timer runs. When the MWL start timer method is executed on the proxy client 107, the proxy client 107 will determine when the methods specified by the timer is to be run the next time. The proxy client 107 can run methods specified by the timer at the appropriate time, and if there are any runs left, determine when the timer needs to run again. MWL stop timer method can stop execution of a specific timer (or all timers) that has been scheduled to be run at a future time.

Figure 5:
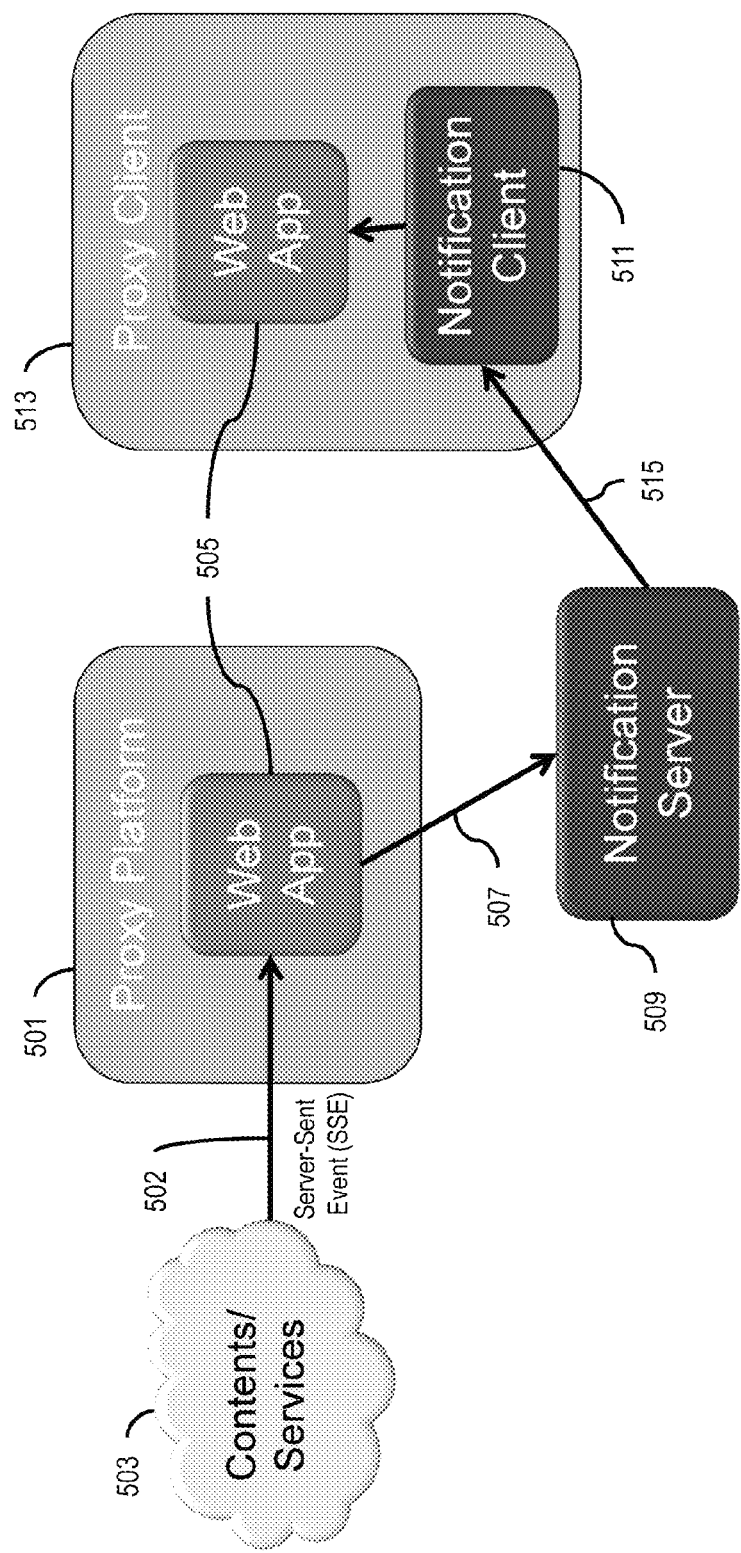
FIGS. 5 through 7 illustrate example architecture diagrams of a system for asynchronous distribution of content and notifications of updates to a client, according to various embodiments.
Figure 6:
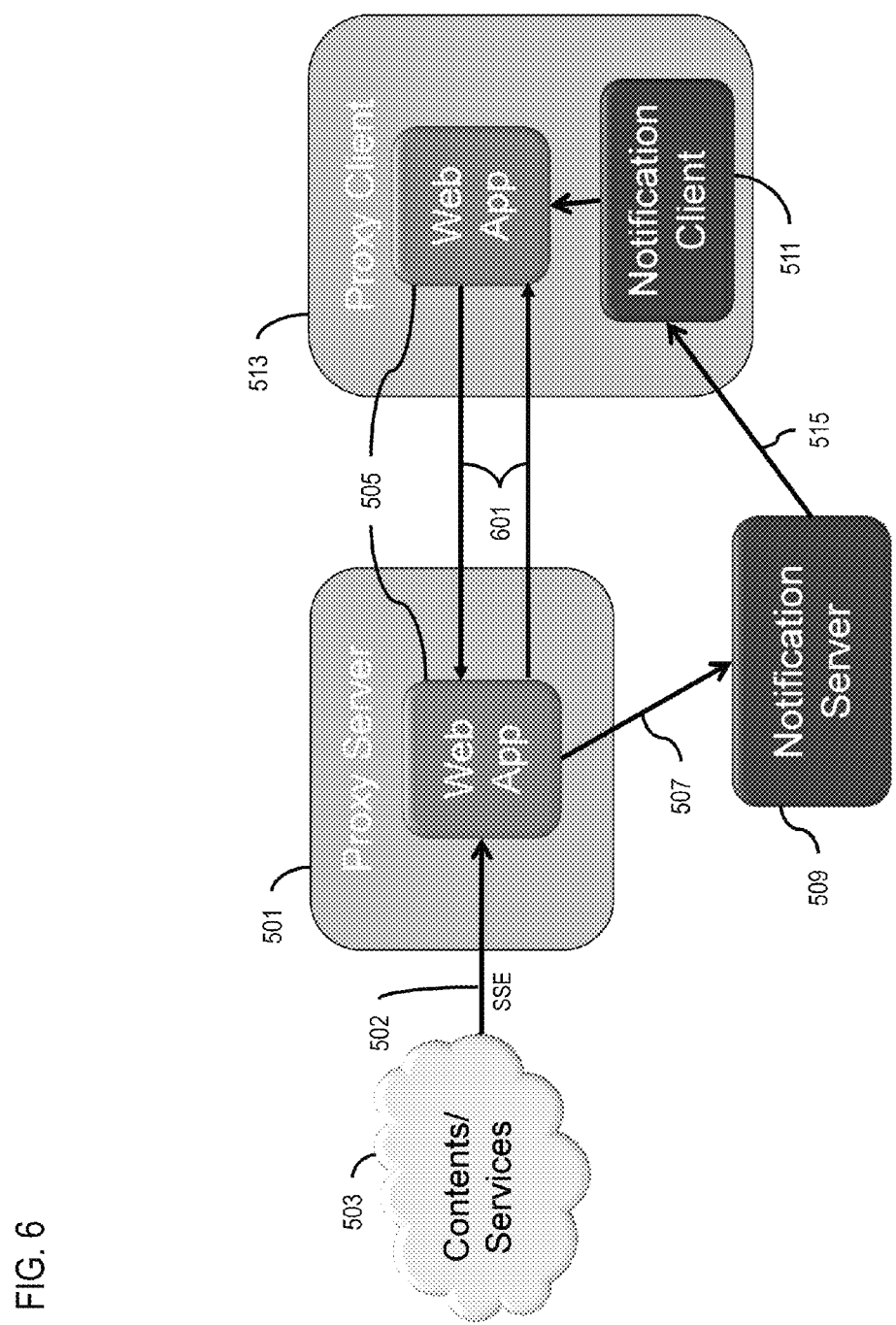
Figure 7:
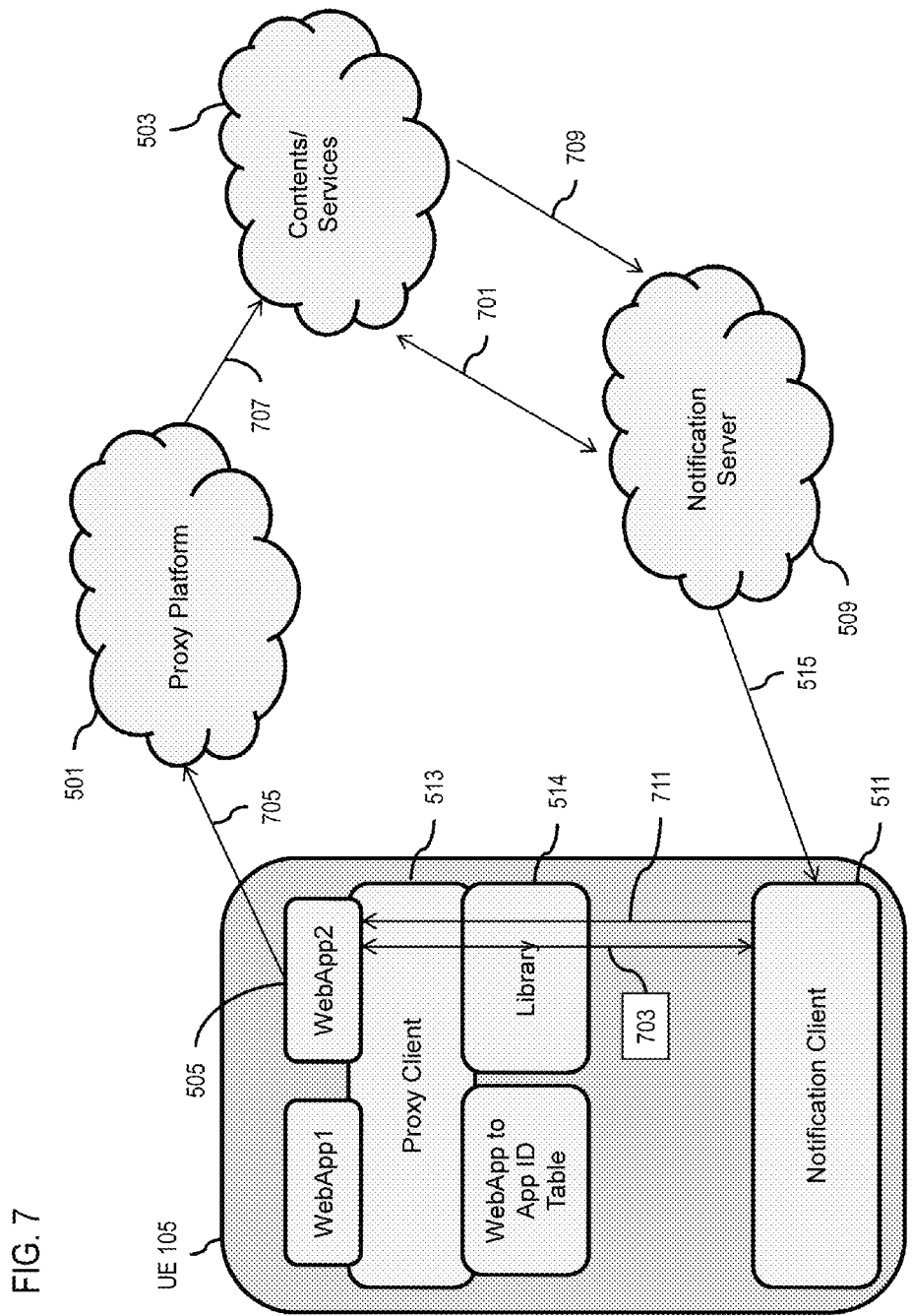

FIGS. 5 through 7 illustrate example architecture diagrams of a system for asynchronous distribution of content and notifications of updates to a client, according to various embodiments.

In FIG. 5, a proxy server 501 may receive various SSEs 502; for example, contents, updates to the contents, and/or notifications, from the contents/services provider 503 via a typical communication channel. Further, the proxy server 501 may utilize a web application 505 for processing the SSEs, the contents, the notifications, and/or the updates and forward them via a communication channel 507 to a notification server 509. In one embodiment, the communication channel 507 is an asynchronous connection. Further, the notification server 509 may process the contents or the updates to determine a targeted notification client 511 at a proxy client 513 and forward the contents or the updates via the communication connection 515 to the notification client 511, wherein the communication channel 515 is an asynchronous communication channel. In one embodiment, the proxy client 513 may include and execute a web application 505 for interfacing with the notification client 511. Referring to FIG. 6, the proxy server 501 may also generate a notification on availability of the contents and/or the updates and forward the notification as well as the contents and/or the updates to the notification server 509. In one embodiment, the proxy server 501 may determine availability of resources at the proxy client 513 and/or at a UE 105 associated with the proxy client 513 in order for the notification server 509 to determine whether to send the notification and/or the contents/updates so that processing of the notification and/or the contents/updates at the proxy client 513 may be as efficient as possible. For example, the proxy client may not be able to receive/process the contents/updates at a given moment and would rather receive the notification so that it can request and receive the contents/updates at a later time. In one embodiment, the notification server 509 may determine which of the notification and/or the contents/updates should be forwarded to the notification client 511 based, at least in part, on the resource information available at the proxy client 513 and/or at the UE 105. In one embodiment, the proxy client 513 may process a notification of availability of contents/updates and then interface with the proxy server 501 for requesting and receiving the contents/updates via communication channel 601, which is different than the communication channel 515, for example, a typical bi-directional communication channel.

In FIG. 7, the notification server 509 may register with and receive an application identification (App ID) from the contents/services 503 via a communication channel 701. Further, at an initial launch, the web application (e.g., webapp2) may register with the proxy client 513, the library 514, and the notification client 511 for passing the App ID and receiving a notification identification (NID) via a communication connection 703 in the UE 105. Further, the web application may execute a script (e.g., HTML, CSS, JavaScript) and register with the proxy server 501 via a communication channel 705, for example, to request/receive contents. Furthermore, the web application registered with the proxy server 501 may also be registered with the contents/services provider 503 via the proxy platform and a communication channel 707. In one embodiment, once the webapp2 receives NID, it may use a JavaScript to callback the NID and pass to contents/services 503, which the contents/services 503 may use for sending notifications at a later time. In one embodiment, the contents/services 503 may transmit a notification of availability of contents/updates to the notification server 509 via a communication channel 709, which may be an asynchronous channel, wherein the notification server 509 may determine a target notification client and transmit/push the notification to the notification client 511 via the asynchronous communication channel 515. Further, the notification client 511 may cause one or more messages/notification to the registered web application 505. In one embodiment, the contents/services 503 may push/transmit asynchronous notifications, contents, and/or updates to the notification client 511 without necessarily routing via the proxy server 501. In one embodiment, the notification client 511 may launch the proxy client 513 and pass the notification at 711, which the proxy client 513 may pass to webapp2 by launching the same and executing the JavaScript function registered by the webapp2.

Figure 8:
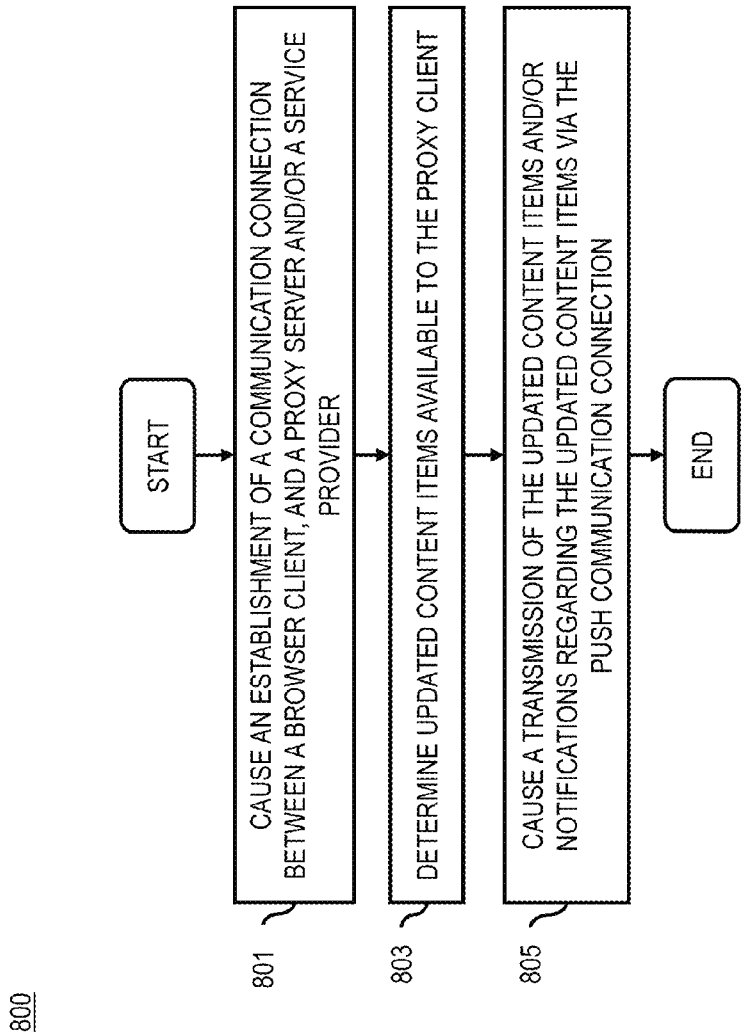
FIGS. 8 through 10 illustrate flowcharts of various processes for, at least, asynchronous distribution of content and notifications of updates to a client, according to various embodiments.
Figure 9:
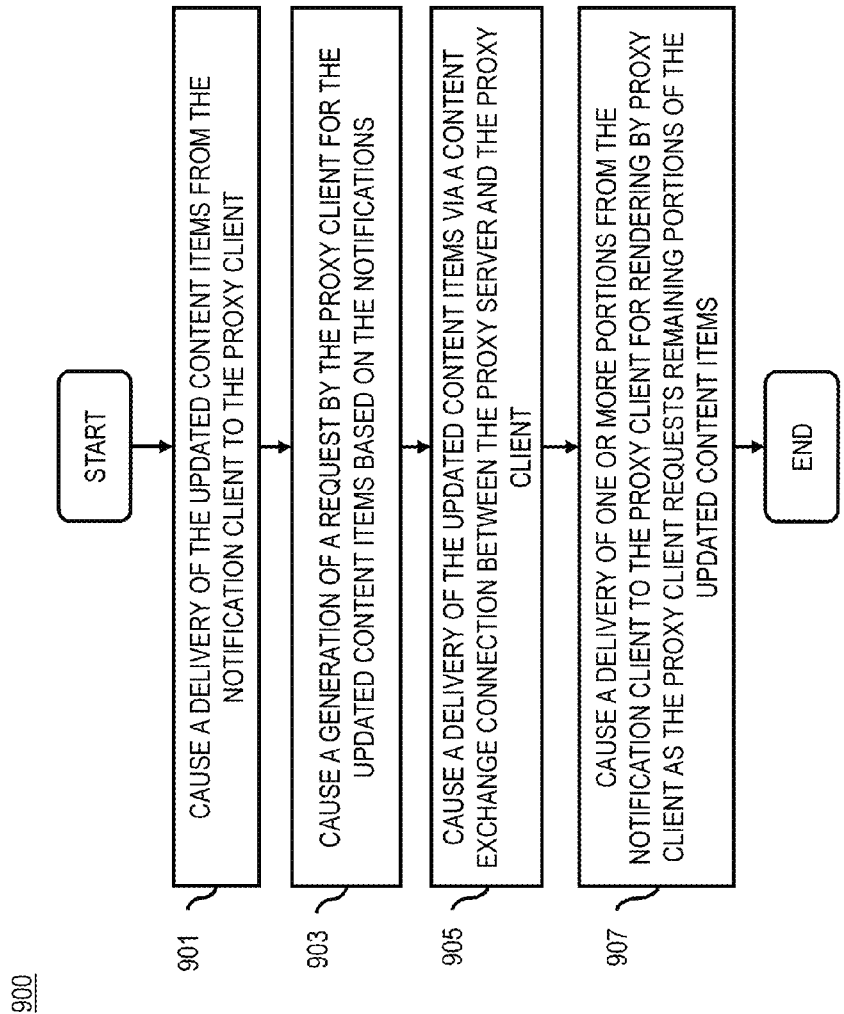
Figure 10:
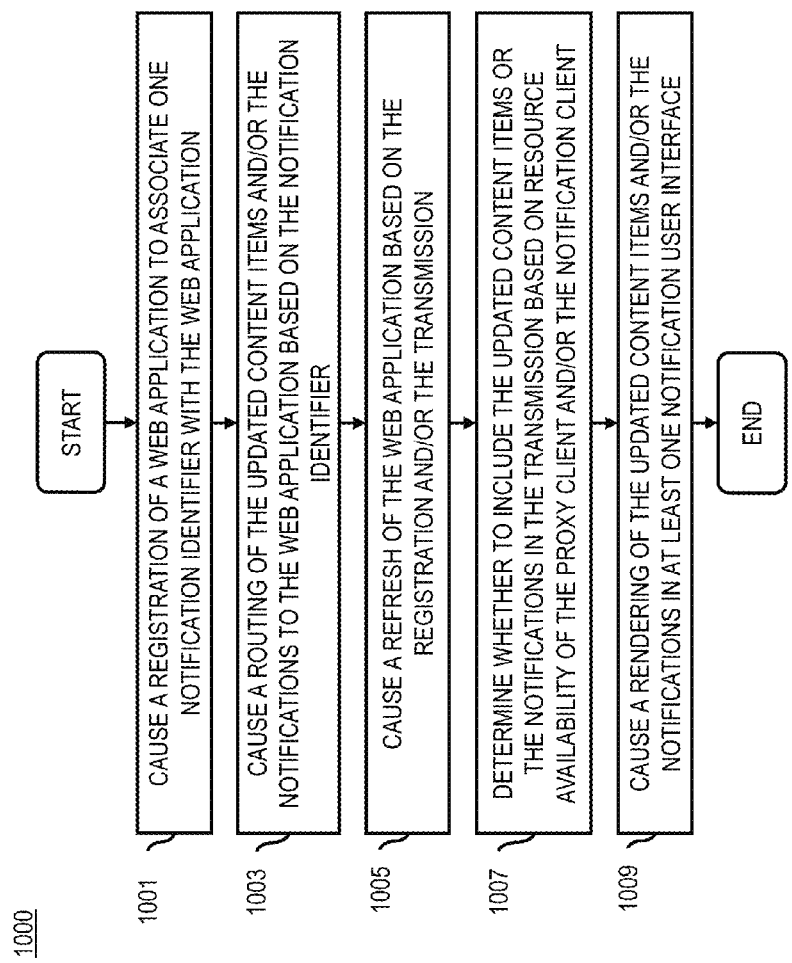

FIGS. 8 through 10 illustrate flowcharts of various processes for, at least, asynchronous distribution of content and notifications of updates to a client, according to various embodiments. In various embodiments, the proxy platform 101 may perform processes 800, 900, and 1000 that may be implemented, for instance, in a chip set including a processor and a memory as shown in FIG. 10. As such, the proxy platform 101 can provide means for accomplishing various parts of the process 800, 900, and 1000 as well as means for accomplishing other processes in conjunction with other components of the system 100. Throughout this process, the proxy platform 101 may be referred to as completing various portions of the processes 800, 800, and 1000, however, it is understood that other components of the system 100 can perform some of and/or all of the process steps. Further, in various embodiments, the proxy platform 101 may be implemented in one or more entities of the system 100.

Referring to FIG. 8, the process 800 begins at step 801 where proxy platform 101 may cause, at least in part, an establishment of at least one communication connection between (a) at least one proxy client, and (b) at least one proxy server, at least one service provider, or a combination thereof. In one embodiment, a proxy client 107 may communicate with a proxy server (proxy platform 101), the services 111, and/or the content providers 113 for requesting and receiving one or more webpages, web applications, notifications, other web contents, or the like, wherein the communications may be direct between the two endpoints or via the communication network 103.

In step 803, the proxy platform 101 may determine one or more updated content items available to the at least one proxy client. In one embodiment, the proxy platform 101 may receive a notification from the services 111 and/or the content providers 113 and determine the availability of the one or more updated content items. In one embodiment, the services 111 and/or the content providers 113 may determine the availability of the one or more updated content items.

In step 805, proxy platform 101 may cause, at least in part, a transmission of the one or more updated content items, one or more notifications regarding the one or more updated content items, or a combination thereof via the at least one communication connection. In one embodiment, the proxy platform 101 may cause the transmission directly to the proxy client 107. In one embodiment, the proxy platform 101 may cause the transmission to the proxy client 107 via the notification server 102 and the notification client 108. In one embodiment, the services 111 and/or the content providers 113 may cause the transmission to the proxy client 107 via the notification server 102 and the notification client 108. In one embodiment, the at least one communication connection is a push notification connection established via at least one notification server, at least one notification client, or a combination thereof. In one embodiment, the push notification connection is an asynchronous communication connection, whereby a transmission may be initiated by at least one end point without a request from receiving end point. In one embodiment, the at least one communication connection is established based, at least in part, on at least one HTML5 protocol SSE from the at least one service provider. For example, when there is an update to a content item at a content provider, the content provider server may send the updated content and/or one or more notifications to the proxy server indicating an availability of the update. In one embodiment, the transmission may include one or more portions of the one or more updated content items delivered to the at least one notification client via the at least one communication connection.

Referring to FIG. 9, the process 900 begins at step 901 where the transmission includes the one or more updated content items as a payload delivered to the at least one notification client via the at least one communication connection, proxy platform 101 may cause, at least in part, a delivery of the one or more updated content items from the at least one notification client to the at least one proxy client. In one embodiment, the proxy platform 101, the services 111, and/or the content providers 113 may cause a transmission of one or more updated content items to the notification client 108 via the notification server 102, wherein the notification client 108 may deliver the updated content items to the proxy client 107.

In step 903, where the transmission includes the one or more notifications delivered to the at least one notification client via the at least one communication connection, the system 100 causes, at least in part, a generation of a request by the at least one proxy client for the one or more updated content items based, at least in part, on the one or more notifications. In one embodiment, the proxy client 107 may receive a notification, for example from the proxy platform 101, indicating availability of one or more updated content items.

In step 905, wherein the transmission includes one or more portions of the one or more updated content items delivered to the at least one notification client via the at least one communication connection, the system 100 causes, at least in part, a delivery of the one or more updated content items via a content exchange connection between the at least one proxy server and the at least one proxy client. In one embodiment, the proxy platform 101 may receive a request for one or more updated content items from the proxy client 107, wherein the proxy platform 101 may cause a transmission of the one or more updated content items directly to the proxy client 107 via a content exchange connection between the proxy server and the proxy client.

In step 907, the system 100 causes, at least in part, a delivery of the one or more portions from the at least one notification client to the at least one proxy client for rendering by the at least one proxy client as the proxy client requests one or more remaining portions of the one or more updated content items. In one embodiment, the proxy client 107 may request a delivery of all available updated content items. In one embodiment, the proxy client 107 may request delivery of one or more portions of the available updated content items. In one embodiment, the proxy client 107 may request delivery of one or more remaining portions of the available updated content items.

Referring to FIG. 10, the process 1000 begins at step 1001 where the system 100 causes, at least in part, a registration of at least one web application to associate at least one notification identifier with the at least one web application, wherein the at least one web application is executed via the at least one proxy client. In one embodiment, the UE 105 may include one or more web applications where at least one web application is registered and associated with at least one notification identifier and a notification client at the UE 105, wherein the at least one web application is executed via the at least one proxy client. For example, the web application may be utilized to consume various contents available at the UE 105 and/or at a web site.

In step 1003, the system 100 causes, at least in part, a routing of the one or more updated content items, the one or more notifications, to the at least one web application based, at least in part, on the at least one notification identifier. In various embodiments, the proxy platform 101, the notification server 102, the services 111, and/or the content providers 113 may utilize a notification identifier for delivering one or more notifications and/or updated content items to a notification client 108 associated with a certain proxy client and web application.

In step 1005, the system 100 causes, at least in part, a refresh of the at least one web application based, at least in part, on the registration, the transmission, or a combination thereof. In one embodiment, the web application may be refreshed by the proxy platform 101, the notification server 102, the services 111, and/or the content providers 113 based on a registration of a web application and/or a transmission to the notification client 108. In one embodiment, the refresh may include updates to one or more content items or notification of available updated content items.

In step 1007, the system 100 determines whether to include the one or more updated content items or whether to include the one or more notifications in the transmission based, at least in part, on resource availability information associated with the at least one proxy client, the at least one notification client, or a combination thereof. In various embodiments, the proxy platform 101, the notification server 102, the services 111, and/or the content providers 113 may determine resource availability information associated with the at least one proxy client and/or the at least one notification client in order to determine whether to deliver the one or more updated content items or to deliver a notification on availability of one or more updated content items. For example, the UE 105 may or may not have appropriate hardware and/or software resources (e.g., proxy client 108, other applications, notification client 108, battery power, bandwidth, etc.) for receiving and processing various updated content items. In one example, only a notification of available updated contents may be delivered to the notification client 108 so that retrieval of the updated contents may be scheduled and handled accordingly at the UE 105. In one embodiment, other components of the system 100 may assist with processing various content items and related tasks before delivering to the UE 105.

In step 1009, the system 100 causes, at least in part, a rendering of the one or more updated content items, the one or more notifications, or a combination thereof in at least one notification user interface, wherein the at least one notification user interface includes, at least in part, one or more options for causing, at least in part, an initiation of the at least one proxy client. In one embodiment, the one or more updated content items and/or the one or more notifications may be presented via a notification UI at the UE 105, wherein a user and/or one or more applications at the UE 105 may cause the initiation of a proxy client 108 at the UE 105.

FIGS. 11A through 11E illustrate timing-sequence diagrams of example processes for asynchronous distribution of content and notifications of updates to a client, according to various embodiments.

In process 1100 of FIG. 11A, a user may utilize a UE 105, that includes the proxy client 513, to launch an application at 1101 to a web access management server 1103 where one or more applications may be accessed and executed for delivering application content at 1105 to the proxy server 501 where the content may be parsed and rendered at 1107 at the proxy server 501. Further, the proxy server 501 may render an initial view of a web application/page to the proxy client 513 via a first response at 1109. Next, the proxy server 501 may detect an event from the contents/services 503 at 1111. Furthermore, while the proxy client 513 may be loading and processing the first response and content therein, the proxy server 501 may generate and transmit one or more requests (e.g., asynchronous JavaScript and XML (Ajax)) at 1113 to a contents/services provider 503 and receive one or more responses 1115 therefrom for parsing and rendering the content at 1117 without interfering with the display and behavior of the existing page. In one embodiment, the proxy server 501 may push/transmit a response, which may include contents, updated contents, notification of available contents/updates, and the like via an asynchronous communication channel 1119. In one embodiment, the notification server 509 may process the contents, updated contents and/or the notification for determining the proxy client 513 and delivering/pushing the contents, updated contents and/or the notification via an asynchronous communication channel 1121.

Figure 11B:
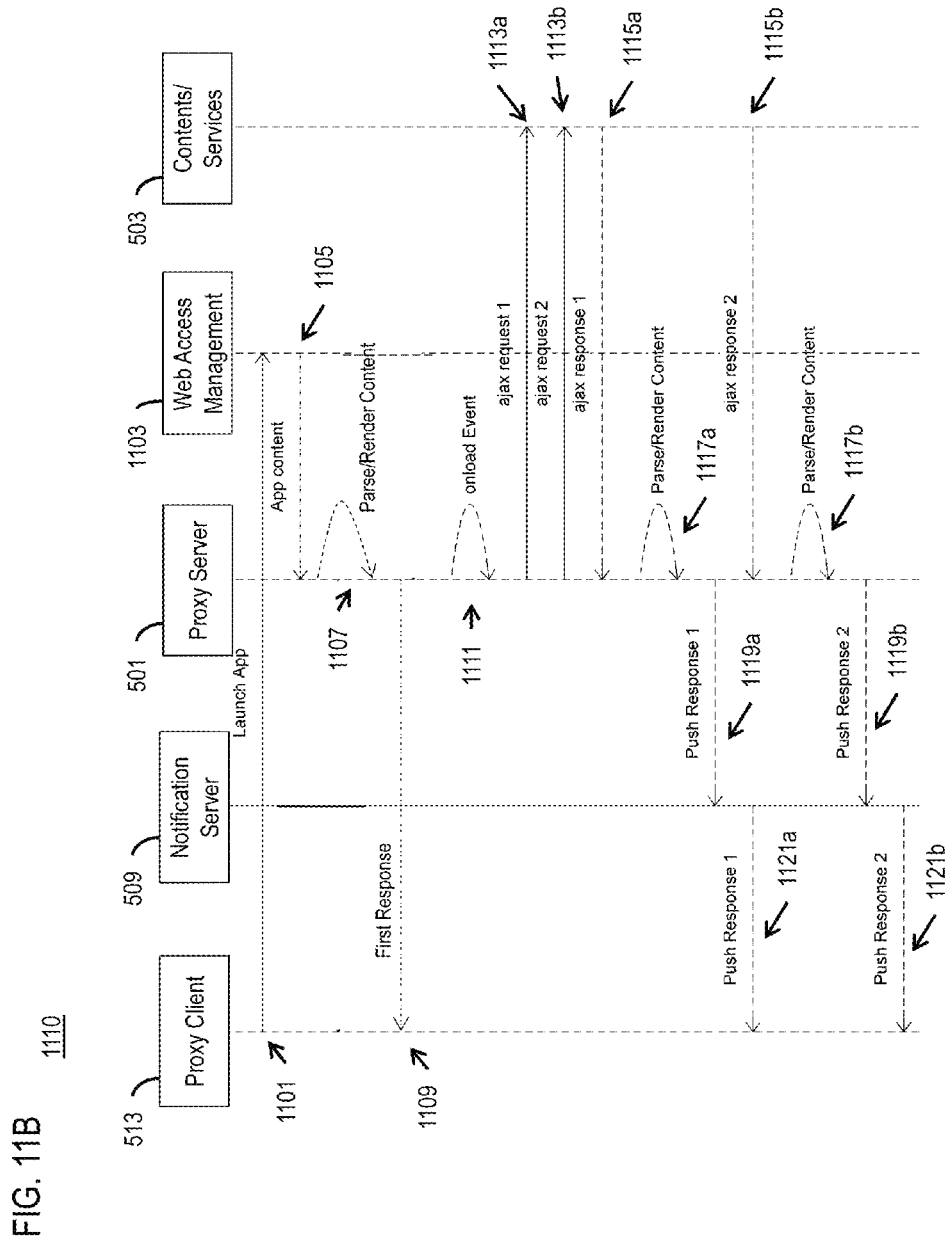

In FIG. 11B, in similar process steps as in the FIG. 11A, process 1110 may proceed where the proxy server 501 may submit a plurality of requests 1113$a$ and 1113$b$ to the contents/services 503, receive a plurality of responses 1115$a$ and 1115$b$, and push a plurality of asynchronous responses 1119$a$-1119$b$ and 1121$a$-1121$b$ to the notification server 509 and the proxy client 513 respectively. In one use case scenario, the multiple responses are delivered asynchronously and independently to the proxy client 513 for a better user experience where the user does not have to wait for delivery of all updates at one time (e.g., can have incremental updates.)

Figure 11C:
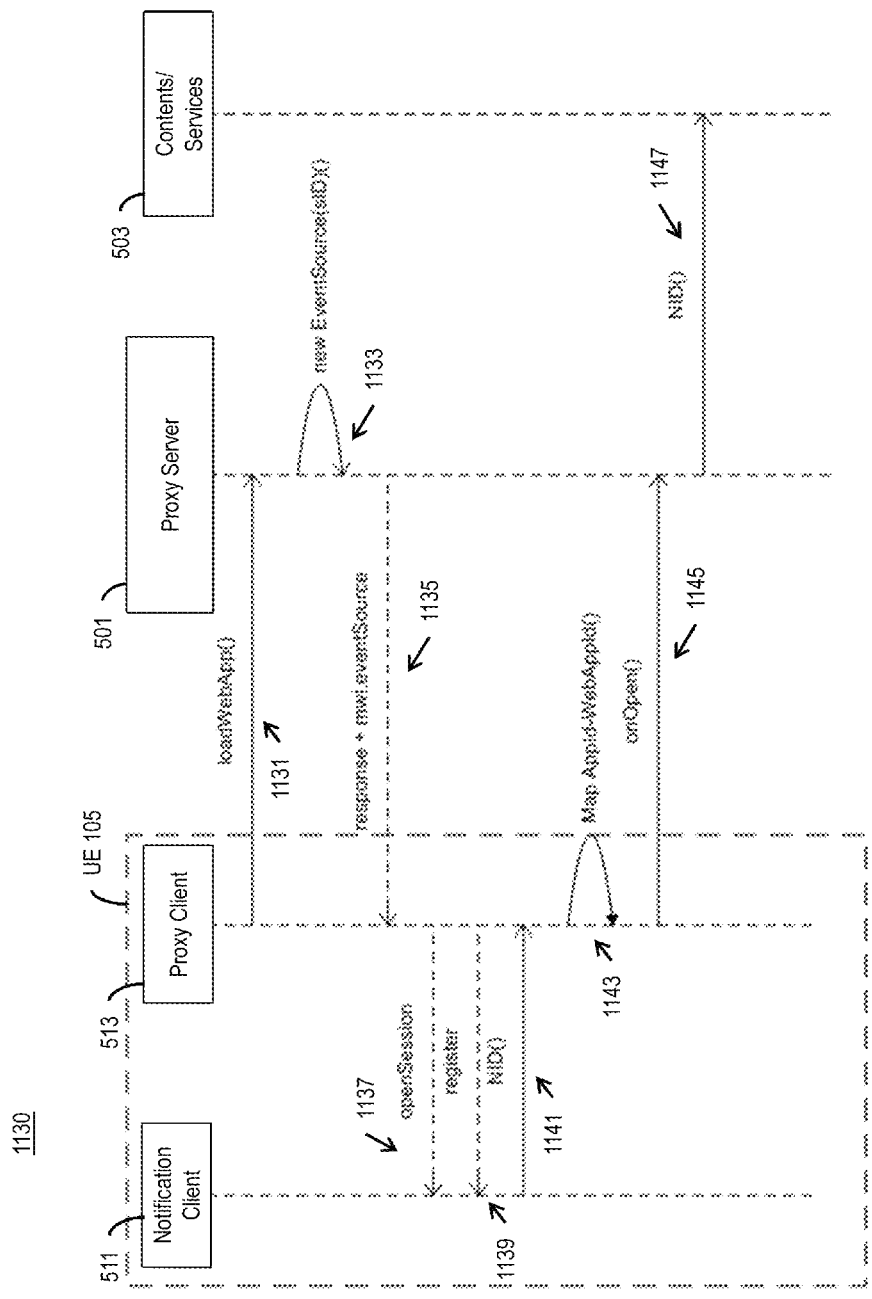

In FIG. 11C, process 1130 begins at step 1131 where the proxy client 513 sends a request to the proxy server 501 to load an application and content where the proxy server 501 processes the request at 1133 and transmits a response 1135 back to the proxy client 513. Further, the proxy client 513 establishes a session 1137 with the notification client 511 and provides registration step at 1139, wherein the notification client provides a NID at 1141 to the proxy client 513. At 1143, the proxy client 513 may process and map the application ID to the web application ID and at 1145 it may transmit the request to the proxy server 501, which at 1147 will forward the request NID to the contents/services 503.

Figure 11D:
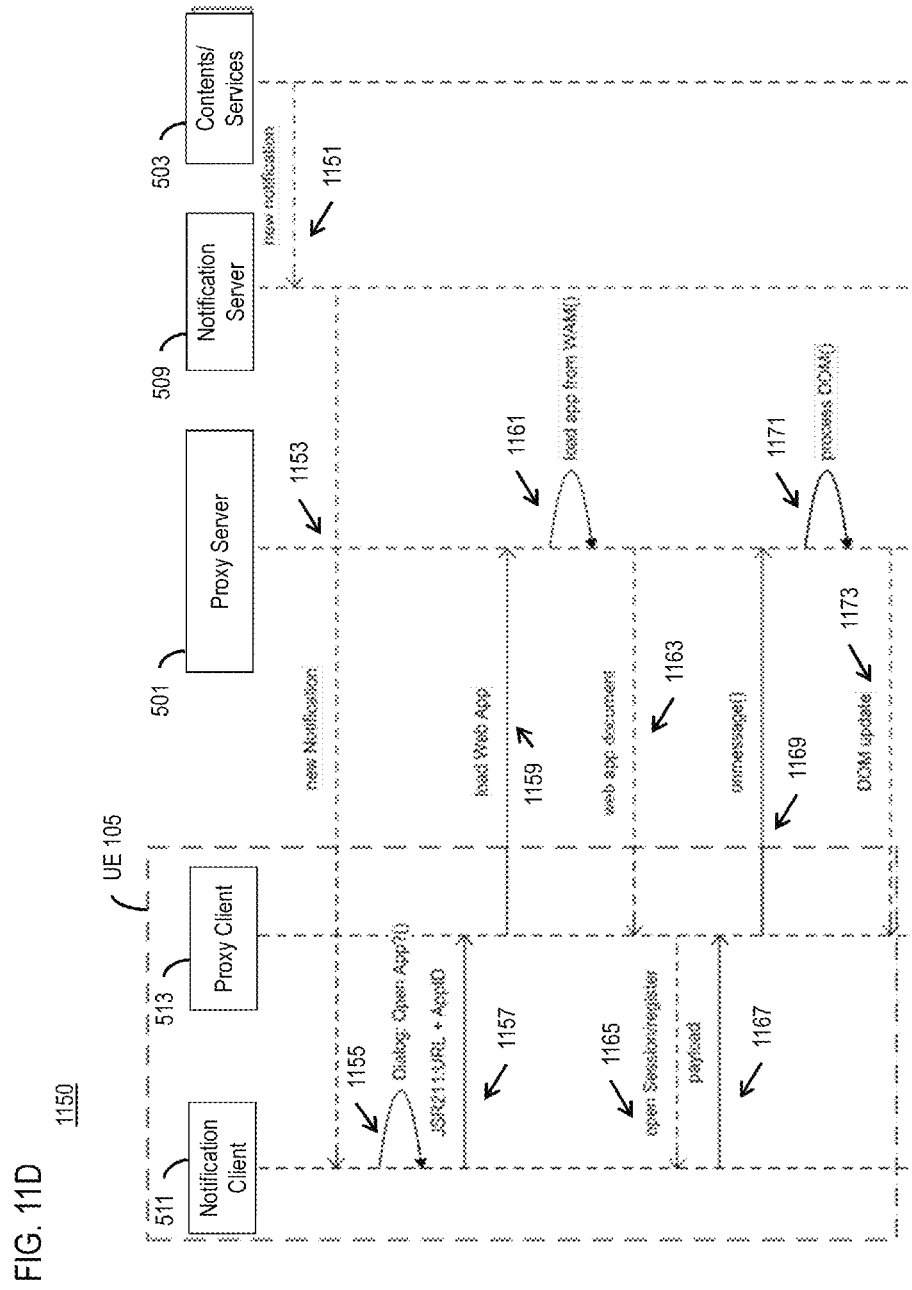

In FIG. 11D, process 1150 begins at 1151 where the contents/services 503 may transmit a notification message to the notification server 509, which may process and/or forward the notification message at 1153 to the notification client 511. In one embodiment, if the web browser application currently is not running at the UE 105, then at 1155 a notification user interface (UI) dialog box may be presented to the user so that the user may select to allow interaction with the proxy server 501. However, if the browser application is already running, then the user may allow the notification client 511, at 1157, to provide application ID, Universal Resource Location (URL), and JavaScript to the proxy client 513, which may submit a request at 1159 to the proxy server 501 for loading the web application. Furthermore, the proxy server 501 may process the request at 1161 and load the requested application and content and at 1163, transmit the web application content (e.g., web application document) to the proxy client 513. Next at 1165, the proxy client 513 may initiate an open session and register with the notification client 511 where the content payload may be delivered at 1167 to the proxy client 513, which at 1169 may transmit a message associated with the notification message (of 1153) to the proxy server 501 for processing at 1171.

Next at 1173, the proxy server 501 may transmit an updated document object model (DOM) back to the proxy client 513.

Figure 11E:
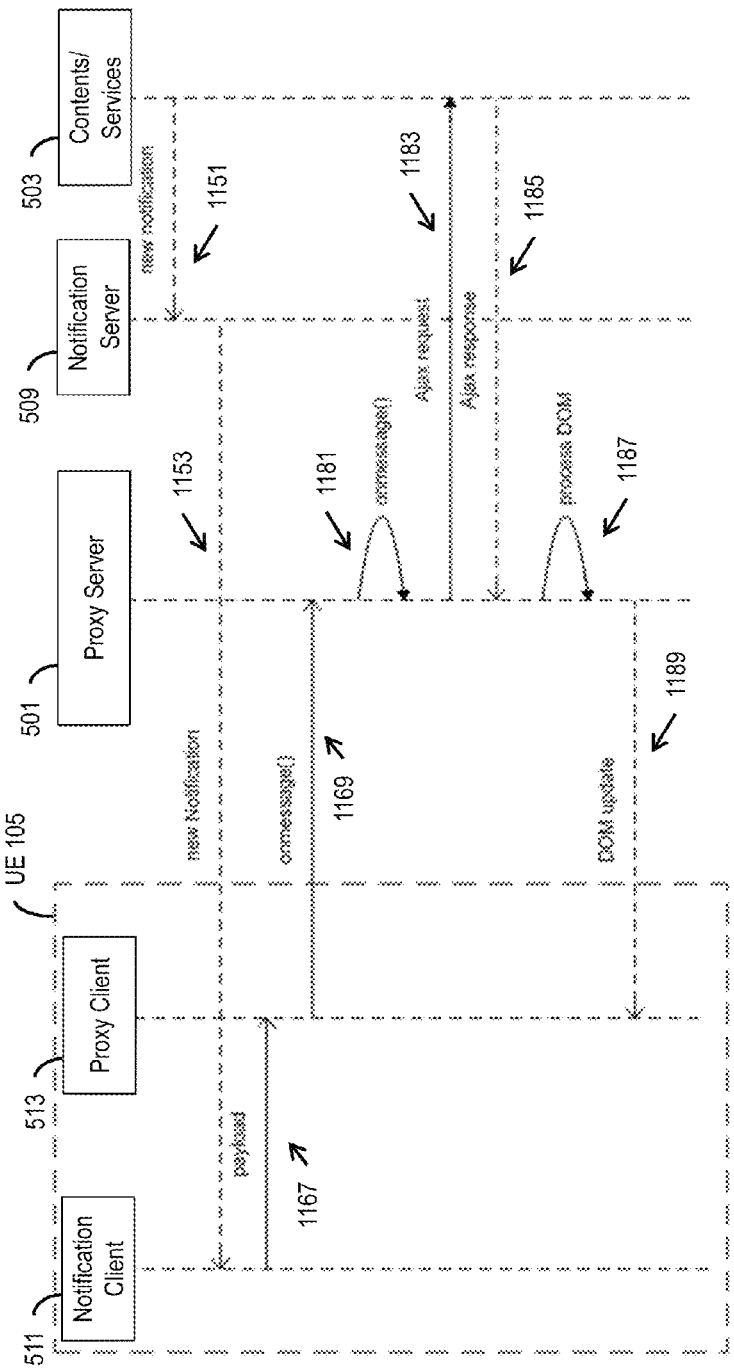

In FIG. 11E, process 1180 begins similar as in FIG. 11D at step 1151, 1153, 1167, and 1169 where the message from the proxy client 513 is transmitted to the proxy server 501. In one embodiment, the proxy server 501 may process the message at 1181 and transmit a request 1183 (e.g., Ajax) to the contents/services 503 and at 1185 receive a response back. In one scenario, the proxy server 501 may process an updated DOM at 1187 and then at 1189 transmit an updated DOM to the proxy client 513.

The processes described herein for asynchronous distribution of content and notifications of updates to a client may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 12:
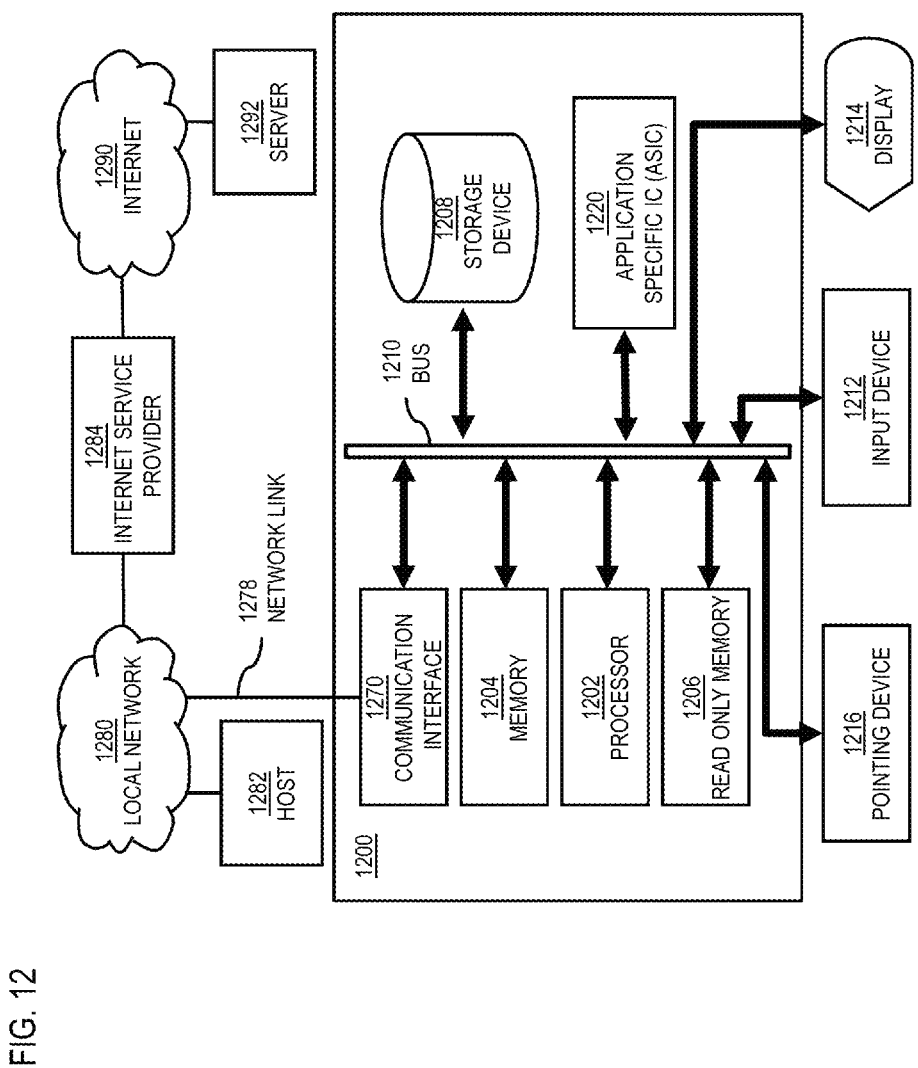
FIG. 12 is a diagram of hardware that can be used to implement an embodiment of the invention.

FIG. 12 illustrates a computer system 1200 upon which an embodiment of the invention may be implemented. Although computer system 1200 is depicted with respect to a particular device or equipment, it is contemplated that other devices or equipment (e.g., network elements, servers, etc.) within FIG. 12 can deploy the illustrated hardware and components of system 1200. Computer system 1200 is programmed (e.g., via computer program code or instructions) to enable asynchronous distribution of content and notifications of updates to a client as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic, and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more steps of asynchronous distribution of content and notifications of updates to a client.

A bus 1210 includes one or more parallel conductors of information so that information is transferred quickly among devices coupled to the bus 1210. One or more processors 1202 for processing information are coupled with the bus 1210.

A processor (or multiple processors) 1202 performs a set of operations on information as specified by computer program code related to asynchronous distribution of content and notifications of updates to a client. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or any other dynamic storage device, stores information including processor instructions for asynchronous distribution of content and notifications of updates to a client. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or any other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for asynchronous distribution of content and notifications of updates to a client, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT), a liquid crystal display (LCD), a light emitting diode (LED) display, an organic LED (OLED) display, a plasma screen, or a printer for presenting text or images, and a pointing device 1216, such as a mouse, a trackball, cursor direction keys, or a motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of ASICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, which carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 113 for asynchronous distribution of content and notifications of updates to a client.

The term "computer-readable medium" as used herein refers to any medium that participates in providing information to processor 1202, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1208. Volatile media include, for example, dynamic memory 1204. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1220.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system 1200 can be deployed in various configurations within other computer systems, e.g., host 1282 and server 1292.

At least some embodiments of the invention are related to the use of computer system 1200 for implementing some or all of the techniques described herein. According to one embodiment of the invention, those techniques are performed by computer system 1200 in response to processor 1202 executing one or more sequences of one or more processor instructions contained in memory 1204. Such instructions, also called computer instructions, software and program code, may be read into memory 1204 from another computer-readable medium such as storage device 1208 or network link 1278. Execution of the sequences of instructions contained in memory 1204 causes processor 1202 to perform one or more of the method steps described herein. In alternative embodiments, hardware, such as ASIC 1220, may be used in place of or in combination with software to implement the invention. Thus, embodiments of the invention are not limited to any specific combination of hardware and software, unless otherwise explicitly stated herein.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server host 1292 transmits program code for a particular application, requested by a message sent from computer 1200, through Internet 1290, ISP equipment 1284, local network 1280 and communications interface 1270. The received code may be executed by processor 1202 as it is received, or may be stored in memory 1204 or in storage device 1208 or any other non-volatile storage for later execution, or both. In this manner, computer system 1200 may obtain application program code in the form of signals on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

Figure 13:
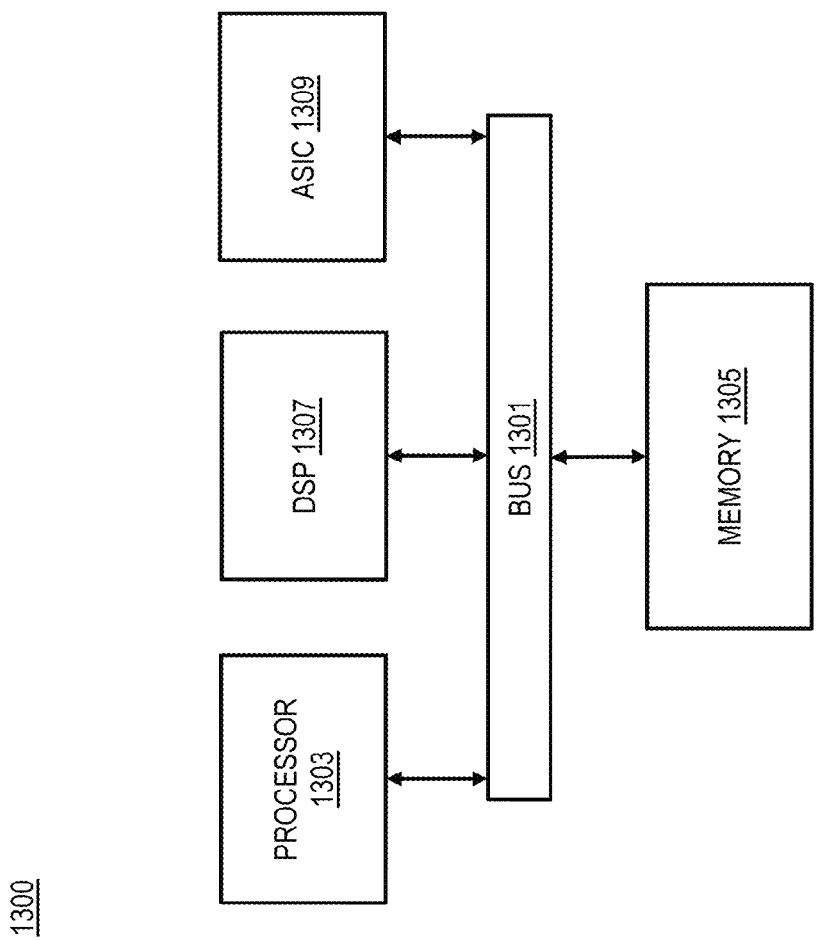
FIG. 13 is a diagram of a chip set that can be used to implement an embodiment of the invention.

FIG. 13 illustrates a chip set or chip 1300 upon which an embodiment of the invention may be implemented. Chip set 1300 is programmed to enable asynchronous distribution of content and notifications of updates to a client as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1300 can be implemented in a single chip. It is further contemplated that in certain embodiments the chip set or chip 1300 can be implemented as a single "system on a chip." It is further contemplated that in certain embodiments a separate ASIC would not be used, for example, and that all relevant functions as disclosed herein would be performed by a processor or processors. Chip set or chip 1300, or a portion thereof, constitutes a means for performing one or more steps of providing user interface navigation information associated with the availability of functions. Chip set or chip 1300, or a portion thereof, constitutes a means for performing one or more steps of asynchronous distribution of content and notifications of updates to a client.

In one embodiment, the chip set or chip 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1300 includes merely one or more processors and some software and/or firmware supporting and/or relating to and/or for the one or more processors.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to asynchronous distribution of content and notifications of updates to a client. The memory 1305 also stores the data associated with or generated by the execution of the inventive steps.

Figure 14:
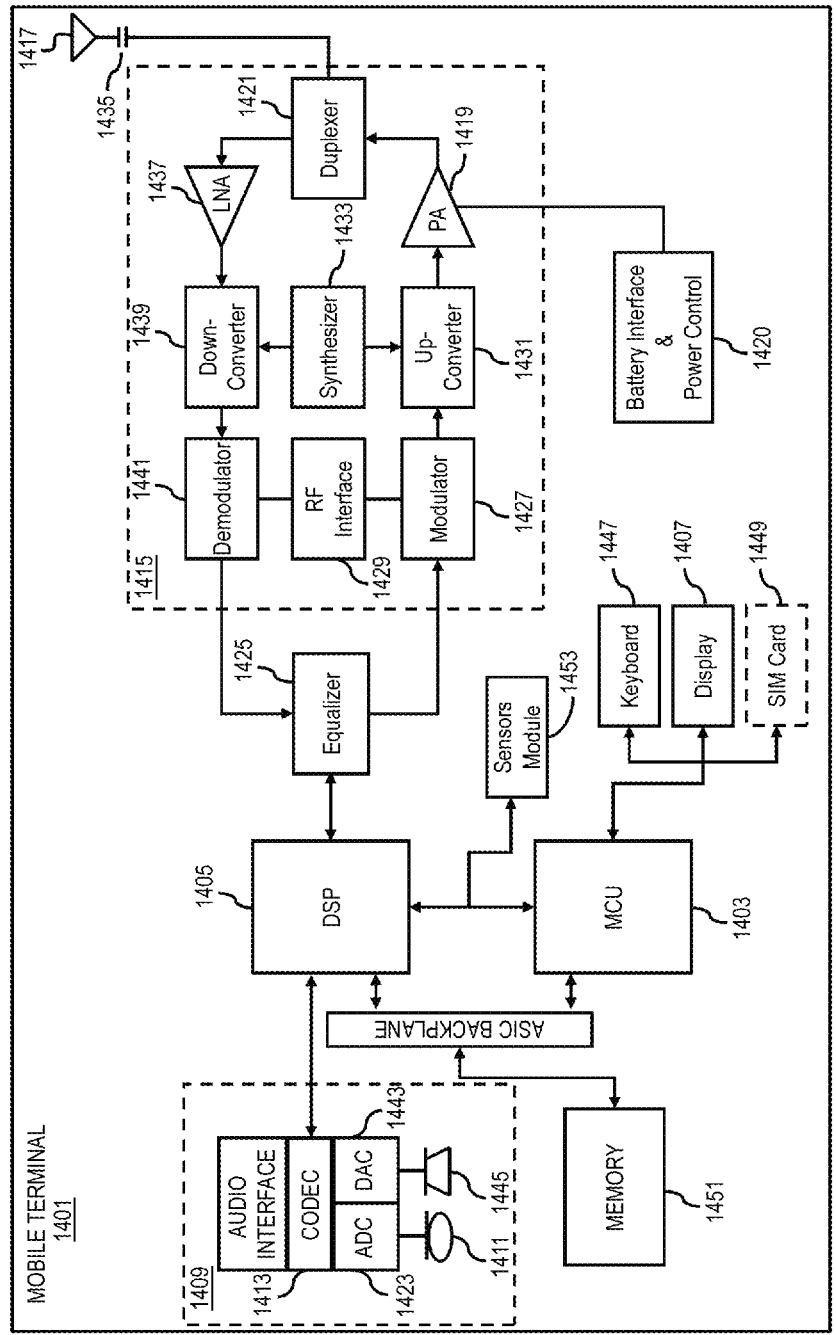
FIG. 14 is a diagram of a mobile station (e.g., handset) that can be used to implement an embodiment of the invention.

FIG. 14 is a diagram of exemplary components of a mobile terminal (e.g., handset) for communications, which is capable of operating in the system of FIG. 1, according to one embodiment. In some embodiments, mobile terminal 1401, or a portion thereof, constitutes a means for performing one or more steps of asynchronous distribution of content and notifications of updates to a client. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile terminal functions that perform or support the steps of asynchronous distribution of content and notifications of updates to a client. The display 1407 includes display circuitry configured to display at least a portion of a user interface of the mobile terminal (e.g., mobile telephone). Additionally, the display 1407 and display circuitry are configured to facilitate user control of at least some functions of the mobile terminal. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile terminal 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1425 for compensation of any frequency-dependent impairment that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403 which can be implemented as a Central Processing Unit (CPU).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile terminal 1401 to enable asynchronous distribution of content and notifications of updates to a client. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the terminal. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile terminal 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile terminal 1401 on a radio network. The card 1449 also contains a memory for storing a personal telephone number registry, text messages, and user specific mobile terminal settings.

Additionally, sensors module 1453 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1401 (e.g., a mobile phone), a user of the mobile terminal 1401, an environment of the mobile terminal 1401 and/or the user, or a combination thereof, wherein the data may be collected, processed, stored, and/or shared with one or more components and/or modules of the mobile terminal 1401 and/or with one or more entities external to the mobile terminal 1401.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:

an establishment of at least one communication connection between (a) at least one proxy client at a user device, and (b) at least one proxy server, at least one service provider, or a combination thereof;

at least one determination of one or more updated web page content items available to the at least one proxy client;

a transmission of the one or more updated web page content items via the at least one communication connection; and another transmission of one or more notifications regarding the one or more updated web page content items to the at least one proxy client via a push notification connection, wherein the at least one communication connection is asynchronous to the push notification connection, and wherein the push notification connection is established via at least one notification server, wherein the at least one notification server is physically separate from the at least one proxy server, the notification server configured to initiate push notifications to the at least one proxy client, the at least one notification server configured to initiate asynchronous push notifications.

2. A method of claim 1, wherein the at least one communication connection is established via at least one notification client.

3. A method of claim 2, wherein the transmission includes the one or more updated content items as a payload delivered to the at least one notification client via the at least one communication connection, and wherein the (1) data and/or (2) information and/or (3) at least one signal are further based, at least in part, on the following:

a delivery of the one or more updated content items from the at least one notification client to the at least one proxy client.

4. A method of claim 2, wherein the transmission includes the one or more notifications delivered to the at least one notification client via the at least one communication connection, and wherein the (1) data and/or (2) information and/or (3) at least one signal are further based, at least in part, on the following:

a generation of a request by the at least one proxy client for the one or more updated content items based, at least in part, on the one or more notifications; and a delivery of the one or more updated content items via a content exchange connection between the at least one proxy server and the at least one proxy client.

5. A method of claim 2, wherein the transmission includes one or more portions of the one or more updated content items delivered to the at least one notification client via the at least one communication connection, and wherein the (1) data and/or (2) information and/or (3) at least one signal are further based, at least in part, on the following:

a delivery of the one or more portions from the at least one notification client to the at least one proxy client for rendering by the at least one proxy client as the proxy client requests one or more remaining portions of the one or more updated content items.

6. A method of claim 2, wherein the (1) data and/or (2) information and/or (3) at least one signal are further based, at least in part, on the following:

a registration of at least one web application to associate at least one notification identifier with the at least one web application, wherein the at least one web application is executed via the at least one proxy client; and a routing of the one or more updated content items, the one or more notifications, to the at least one web application based, at least in part, on the at least one notification identifier.

7. A method of claim 6, wherein the (1) data and/or (2) information and/or (3) at least one signal are further based, at least in part, on the following:

a refresh of the at least one web application based, at least in part, on the registration, the transmission, or a combination thereof.

8. A method of claim 2, wherein the at least one communication connection is established based, at least in part, on at least one Hyper Text Markup Language 5 protocol server-sent event from the at least one service provider.

9. A method of claim 1, wherein the (1) data and/or (2) information and/or (3) at least one signal are further based, at least in part, on the following:

at least one determination of whether to include the one or more updated content items or whether to include the one or more notifications in the transmission based, at least in part, on resource availability information associated with the at least one proxy client, the at least one notification client, or a combination thereof.

10. A method of claim 1, wherein the (1) data and/or (2) information and/or (3) at least one signal are further based, at least in part, on the following:

a rendering of the one or more updated content items, the one or more notifications, or a combination thereof in at least one notification user interface, wherein the at least one notification user interface includes, at least in part, one or more options for causing, at least in part, an initiation of the at least one proxy client.

11. An apparatus comprising:

at least one processor; and at least one memory including computer program code for one or more programs, the at least one memory and the computer program code configured to, with the at least one processor, cause the apparatus to perform at least the following, cause, at least in part, an establishment of at least one communication connection between (a) at least one proxy client, and (b) at least one proxy server, at least one service provider, or a combination thereof;

determine one or more updated web page content items available to the at least one proxy client;

cause, at least in part, a transmission of the one or more updated web page content items via the at least one communication connection; and cause, at least in part, another transmission of one or more notifications regarding the one or more updated web page content items to the at least one proxy client via a push notification connection, wherein the at least one communication connection is asynchronous to the push notification connection, and wherein the push notification connection is established via at least one notification server, wherein the at least one notification server is physically separate from the at least one proxy server, the at least one notification server is configured to initiate push notifications to the at least one proxy client, the at least one notification server is configured to initiate asynchronous push notifications.

12. An apparatus of claim 11, wherein the at least one communication connection is established via at least one notification client.

13. An apparatus of claim 12, wherein the transmission includes the one or more updated content items as a payload delivered to the at least one notification client via the at least one communication connection, and wherein the apparatus is further caused to:

cause, at least in part, a delivery of the one or more updated content items from the at least one notification client to the at least one proxy client.

14. An apparatus of claim 12, wherein the transmission includes the one or more notifications delivered to the at least one notification client via the at least one communication connection, and wherein the apparatus is further caused to:

cause, at least in part, a generation of a request by the at least one proxy client for the one or more updated content items based, at least in part, on the one or more notifications; and cause, at least in part, a delivery of the one or more updated content items via a content exchange connection between the at least one proxy server and the at least one proxy client.

15. An apparatus of claim 12 wherein the transmission includes one or more portions of the one or more updated content items delivered to the at least one notification client via the at least one communication connection, and wherein the apparatus is further caused to:

cause, at least in part, a delivery of the one or more portions from the at least one notification client to the at least one proxy client for rendering by the at least one proxy client as the proxy client requests one or more remaining portions of the one or more updated content items.

16. An apparatus of claim 12, wherein the apparatus is further caused to:

cause, at least in part, a registration of at least one web application to associate at least one notification identifier with the at least one web application, wherein the at least one web application is executed via the at least one proxy client; and cause, at least in part, a routing of the one or more updated content items, the one or more notifications, to the at least one web application based, at least in part, on the at least one notification identifier.

17. An apparatus of claim 16, wherein the apparatus is further caused to:

cause, at least in part, a refresh of the at least one web application based, at least in part, on the registration, the transmission, or a combination thereof.

18. An apparatus of claim 12, wherein the at least one communication connection is established based, at least in part, on at least one Hyper Text Markup Language 5 protocol server-sent event from the at least one service provider.

19. An apparatus of claim 11, wherein the apparatus is further caused to:

determine whether to include the one or more updated content items or whether to include the one or more notifications in the transmission based, at least in part, on resource availability information associated with the at least one proxy client, the at least one notification client, or a combination thereof.

20. An apparatus of claim 11, wherein the apparatus is further caused to:

cause, at least in part, a rendering of the one or more updated content items, the one or more notifications, or a combination thereof in at least one notification user interface, wherein the at least one notification user interface includes, at least in part, one or more options for causing, at least in part, an initiation of the at least one proxy client.

21. A method of claim 1, wherein the proxy server provides distributed script processing for performing updates or for using local device resources.

22. An apparatus of claim 11, wherein the proxy server provides distributed script processing for performing updates for using local device resources.

23. The method of claim 1, wherein the proxy server maintains a first list of web page content items containing items previously transmitted to the proxy client and a second list of web page content items in response to a request by the proxy client.

24. The apparatus of claim 11, wherein the proxy server maintains a first list of web page content items containing items previously transmitted to the proxy client and a second list of web page content items in response to a request by the proxy client.

25. The method of claim 21, wherein the distributed script processing is based media list comparisons for reusing media of the one or more updated web page content items.

* * * * *